(12) United States Patent
Kratchman et al.

(10) Patent No.: US 11,863,086 B2
(45) Date of Patent: Jan. 2, 2024

(54) ELECTROSTATIC MOTOR

(71) Applicant: The Charles Stark Draper Laboratory, Inc., Cambridge, MA (US)

(72) Inventors: Louis Beryl Kratchman, Quincy, MA (US); James A. Bickford, Winchester, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 210 days.

(21) Appl. No.: 17/186,986

(22) Filed: Feb. 26, 2021

(65) Prior Publication Data

US 2021/0184599 A1 Jun. 17, 2021

Related U.S. Application Data

(63) Continuation of application No. 16/277,584, filed on Feb. 15, 2019, now Pat. No. 10,958,191.

(60) Provisional application No. 62/631,263, filed on Feb. 15, 2018.

(51) Int. Cl.
*H02N 1/00* (2006.01)
*H01G 7/02* (2006.01)
*H02N 2/10* (2006.01)

(52) U.S. Cl.
CPC .............. *H02N 1/004* (2013.01); *H01G 7/02* (2013.01); *H02N 2/10* (2013.01)

(58) Field of Classification Search
CPC ............. H02N 1/004; H02N 2/10; H01G 7/02
USPC ......................................................... 310/309
See application file for complete search history.

(56) References Cited

U.S. PATENT DOCUMENTS

| | | | |
|---|---|---|---|
| 497,226 | A | 5/1893 | Waite |
| 555,190 | A | 2/1896 | Tesla |
| 735,621 | A | 8/1903 | Thomson |
| 883,846 | A | 4/1908 | Wommelsdorf |
| 1,974,483 | A | 9/1934 | Brown |
| 2,232,143 | A | 2/1941 | Schweitzer, Jr. |
| 2,266,057 | A | 12/1941 | Massolle |
| 2,417,850 | A | 3/1947 | Winslow |
| 2,519,554 | A | 8/1950 | Felici |
| 2,522,106 | A | 9/1950 | Felici |
| 2,523,688 | A | 9/1950 | Felici |
| 2,530,193 | A | 11/1950 | Felici |

(Continued)

FOREIGN PATENT DOCUMENTS

| | | |
|---|---|---|
| CN | 1175544 C | 11/2004 |
| EP | 0 837 551 A3 | 10/1998 |

(Continued)

OTHER PUBLICATIONS

"Dielectric Polarization Physics," 28 pages; date/author unknown.

(Continued)

*Primary Examiner* — John K Kim
(74) *Attorney, Agent, or Firm* — George Jakobsche Patent Counsel PLLC

(57) ABSTRACT

An electrostatic motor includes a cylindrical rotor and a stator. Electrodes are disposed on an inside cylindrical surface of the stator. Electrets and/or electrically conductive electrodes are disposed on the cylindrical rotor and a dielectric fluid fills space between the rotor and the stator to prevent discharge of the electrets. A mask is used to charge portions of an electret cylinder or other curved surface.

5 Claims, 20 Drawing Sheets

(56) References Cited

U.S. PATENT DOCUMENTS

| | | | |
|---|---|---|---|
| 2,540,327 A | 2/1951 | Felici | |
| 2,542,494 A | 2/1951 | Felici | |
| 2,617,976 A | 11/1952 | Felici | |
| 2,675,516 A | 4/1954 | Felici | |
| 2,737,625 A | 3/1956 | Felici | |
| 2,810,878 A | 10/1957 | Felici | |
| 3,233,157 A | 2/1966 | Stockman | |
| 3,297,888 A | 1/1967 | Zwolski | |
| 3,334,949 A | 8/1967 | Atkinson | |
| 3,400,282 A | 9/1968 | Felici | |
| 3,414,742 A | 12/1968 | Fisher et al. | |
| 3,418,501 A | 12/1968 | Felici et al. | |
| 3,433,981 A | 3/1969 | Bollee | |
| 3,436,630 A | 4/1969 | Bollee | |
| 3,444,062 A | 5/1969 | Felici et al. | |
| 3,629,624 A | 12/1971 | Staudte | |
| 3,652,955 A | 3/1972 | Cruger et al. | |
| 3,674,602 A | 7/1972 | Keogh et al. | |
| 3,696,258 A | 10/1972 | Anderson et al. | |
| 3,702,493 A | 11/1972 | Murphy | |
| 3,705,312 A | 12/1972 | Sessler et al. | |
| 3,951,000 A | 4/1976 | Ferriss et al. | |
| 4,225,801 A | 9/1980 | Parker, Jr. | |
| 4,527,218 A | 7/1985 | von Seggern | |
| 4,642,504 A | 2/1987 | Jacobsen | |
| 4,754,185 A | 6/1988 | Gabriel et al. | |
| 4,922,164 A | 5/1990 | Jacobsen et al. | |
| 4,943,750 A | 7/1990 | Howe et al. | |
| 5,093,594 A | 3/1992 | Mehregany | |
| 5,187,399 A | 2/1993 | Carr et al. | |
| 5,191,251 A | 3/1993 | Paratte | |
| 5,235,225 A | 8/1993 | Colgate et al. | |
| 5,237,234 A | 8/1993 | Jebens et al. | |
| 5,239,222 A | 8/1993 | Higuchi et al. | |
| 5,517,072 A | 5/1996 | Hildebrandt | |
| 6,119,536 A | 9/2000 | Popovic et al. | |
| 6,353,276 B1* | 3/2002 | Gendron | H02N 1/004 310/309 |
| 7,068,457 B2 | 6/2006 | Riddering et al. | |
| 7,239,065 B2 | 7/2007 | Horst | |
| 7,651,553 B2 | 1/2010 | Pletcher et al. | |
| 7,834,513 B2 | 11/2010 | Post | |
| 8,264,121 B2 | 9/2012 | Post | |
| 8,278,797 B2 | 10/2012 | Sashida | |
| 8,384,267 B2* | 2/2013 | Naruse | H02N 1/08 310/309 |
| 8,779,647 B2 | 7/2014 | Sashida | |
| 9,184,676 B2 | 11/2015 | Ludois | |
| 9,190,190 B1 | 11/2015 | Moeny | |
| 9,479,085 B1 | 10/2016 | Ludois et al. | |
| 9,571,010 B2 | 2/2017 | Ludois | |
| 9,614,462 B2 | 4/2017 | Post | |
| 9,979,323 B1 | 5/2018 | Ghule et al. | |
| 10,840,826 B2 | 11/2020 | Ikeda | |
| 10,958,191 B2* | 3/2021 | Kratchman | H01G 7/02 |
| 2004/0036377 A1 | 2/2004 | Mezinis | |
| 2006/0006759 A1 | 1/2006 | Matsuki | |
| 2006/0037516 A1 | 2/2006 | Moeny | |
| 2006/0214535 A1 | 9/2006 | Salmon | |
| 2008/0007137 A1* | 1/2008 | Horst | H02N 1/004 310/309 |
| 2008/0192406 A1 | 8/2008 | Despesse et al. | |
| 2008/0211342 A1 | 9/2008 | Despesse | |
| 2010/0026137 A1 | 2/2010 | Murari et al. | |
| 2010/0079031 A1 | 4/2010 | Murayama et al. | |
| 2011/0163615 A1 | 7/2011 | Leonov | |
| 2011/0260699 A1 | 10/2011 | Nakatsuka et al. | |
| 2012/0168204 A1 | 7/2012 | Vance | |
| 2012/0240614 A1 | 9/2012 | Norbeck et al. | |
| 2013/0147285 A1* | 6/2013 | Mader | H02K 41/02 310/12.14 |
| 2013/0300252 A1 | 11/2013 | Johnson | |
| 2013/0313838 A1* | 11/2013 | Sakamoto | H02K 35/04 290/1 R |
| 2014/0028151 A1* | 1/2014 | Morita | H10N 35/101 310/12.14 |
| 2014/0184017 A1 | 7/2014 | Post | |
| 2014/0252914 A1 | 9/2014 | Post | |
| 2014/0265722 A1 | 9/2014 | Post | |
| 2014/0368181 A1 | 12/2014 | Post | |
| 2015/0054372 A1* | 2/2015 | Chung | H02K 41/031 310/216.096 |
| 2015/0187477 A1* | 7/2015 | Makino | H02K 41/031 310/58 |
| 2015/0236619 A1* | 8/2015 | Hattori | H02N 1/08 310/309 |
| 2016/0099663 A1 | 4/2016 | Petrowsky et al. | |
| 2016/0211775 A1 | 7/2016 | Ge et al. | |
| 2016/0306469 A1 | 10/2016 | Kennedy | |
| 2016/0344306 A1 | 11/2016 | Ge et al. | |
| 2017/0191466 A1 | 7/2017 | Perez et al. | |
| 2017/0194840 A1 | 7/2017 | Garriga et al. | |
| 2019/0052192 A1 | 2/2019 | Post et al. | |
| 2019/0052193 A1 | 2/2019 | Post | |
| 2019/0081576 A1 | 3/2019 | Yamamoto | |
| 2019/0222142 A1 | 7/2019 | Ikeda | |
| 2019/0222144 A1 | 7/2019 | Post | |
| 2019/0253000 A1* | 8/2019 | Kratchman | H02N 2/10 |
| 2019/0260264 A1 | 8/2019 | Post | |
| 2020/0028451 A1 | 1/2020 | Post et al. | |
| 2021/0184599 A1* | 6/2021 | Kratchman | H02N 1/004 |

FOREIGN PATENT DOCUMENTS

| | | |
|---|---|---|
| EP | 1 128 541 A3 | 12/2003 |
| GB | 639653 | 5/1946 |
| JP | 64-69269 | 3/1989 |
| JP | 4-248375 | 9/1992 |
| JP | 2814582 B2 | 10/1998 |
| JP | 3923049 | 5/2007 |
| JP | 4027327 | 12/2007 |
| RU | 1452427 A1 | 12/1994 |
| SU | 780130 A1 | 11/1980 |
| SU | 1005255 | 3/1983 |
| WO | WO 2016/118570 A1 | 7/2016 |

OTHER PUBLICATIONS

3M™, "3M™ Novec™ 4710 Insulating Gas," 4 pages, 2017.

Adler, "Pulse Power Formulary," *North Star Research Corporation*, 49 pages, Aug. 1989 and Mar. 2001.

Amajadi, et al., "Silicon-Based Inorganic Electrets for Application in Micromachined Devices," *IEEE Transactions on Dielectrics and Electrical Insulation*, vol. 3, No. 4, pp. 494-498, Aug. 1996.

Anders, et al., "Charge Distribution and Stability in Electret Materials," *Technical University of Denmark*, 149 pages, 2016.

API, "Protection Against Ignitions Arising out of Static, Lightning and Stray Currents," *Health and Environmental Affairs Department*, Sixth Edition, 58 pages, Sep. 1998.

Arkema, "GPS Safety Summary—Hydrogen Peroxide," *Arkema Innovative Chemistry*, pp. 1-5, 2013.

Atrazhev, et al., "Mechanism of Impulse Breakdown in Liquid: The Role of Joule Heating and Formantion of Gas Cavities," *IEEE Transactions on Plasma Science*, vol. 38, No. 10, pp. 2644-2651, Oct. 2010.

Balmer, "Electrostatic Generatoin in Dielectric Fluids: The Viscoelectric Effect," *Research Gate*, pp. 1-8, 2005.

Balygin, "Electric Strength of Liquid Dielectrics," *NTIS*, 323 pages, Nov. 1972.

Bentley, "In Pursuit of Better Bearings . . . ," *Orbit*, Second Quarter, pp. 33-42, 2000.

Berger, "Dielectric Strength of Insulation Materials," *CRC Handbook of Chemistry and Physics*, 5 pages, 2003.

Beroual, et al., "Recent Advances in the Quest for a New Insulation Gas With a Low Impact on the Enviroment to Replace Sulfur Hexafluoride ($SF_2$) Gas in High-Voltage Power Network Applications," *Energies*, vol. 10, No. 1216, pp. 1-20, 2017.

Beroual, et al., "Propagation and Structure of Streamers in Liquid Dielectrics," *IEEE Dielectrics and Electrical Insulation Society*, pp. 6-17, 1998.

(56) References Cited

OTHER PUBLICATIONS

Bischoff, "A High-Pressure, Flowing Liquid Dielectric Pulse-Forming Line," *IEEE Transactions on Plasma Science*, vol. 43, No. 10, pp. 3381-3384, Oct. 2015.
Bishchoff, "Design and Performance of a High-Pressure, Flowing Liquid Dielectric Peaking Switch," *IEEE*, pp. 118-123, 2012.
Boisseau, et al., "Optimization of an Electrect-Based Energy Harvester," *Smart Materials and Structures*, 16 pages, 2010.
Boisseau, et al., "Electrostatic Conversion for Vibration Energy Harvesting," *Intech*, 39 pages, 2012.
Boisseau, et al., "New DRIE-Patterned Electrets for Vibraiton Energy Harvesting," *EPJ Web of Conferences*, 8 pages, 2012.
Boland, et al., "Micro Electret Power Generator," *IEEE*, pp. 538-541, 2003.
Bollée, B., "Electrostatic Motors," *Philips Technical Review*, vol. 30, pp. 178-194, 1969.
Boone, et al., "The Influence of Fluorine Atoms on the Electric Strength of Liquids," *IEEE*, pp. 78-85, 1970.
Bowman, "The Design and Construction of a Visco Seal Test Facility," Masters Theses, the University of Tennessee, 108 pages, 1996.
Brignell, et al., "Electric Breakdown in n-Hexane," *Nature*, vol. 206, pp. 1142-1143, Jun. 12, 1965.
Burkhart, "Pulsed Power Engineering Materials & Passive Components and Devices," *Power Conversion Department*, 56 pages, Jan. 12-16, 2009.
Chapman, et al., "Micromotor Technology: Electric Drive Designer's Perspective,"*IEEE*, pp. 1978-1983, 2001.
Chaudhary, et al., "A Novel Planar Ion Funnel Design for Minature Ion Optics,"*Review of Scientific Instruments*, vol. 85, 7 pages, 2014.
Chen, et al., "A Charging Method for Electrets Based on Interfacial Polarization," *IEEE Transactions on Dielectrics and Electrical Insulation*, vol. 25, No. 3, pp. 797-802, Jun. 2018.
Christophorou, et al., "Basic Physics of Gaseous Dielectrics," *IEEE Transactions on Electrical Insulation*, vol. 25, No. 1, pp. 55-74, Feb. 1990.
Christophorou, et al., "Gases for Electrical Insulation and Arc Interruption; Possible Present and Future Alternatives to $SF_6$," *NIST Technical Note 1425*, 56 pages, 1997.
Claiborne, et al., "Transformer Fluids," *IEEE Electrical Insulation Magazine*, vol. 5, No. 4, pp. 16-19, Jul./Aug. 1989.
Clearco, "Lowest Viscosity Linear Polydimethylsiloxane: HMDS Hexamethyldisiloxane," Product Information, www.clearcoproducts.com; 1 page; 2015.
Cermont, "Characterization and Predication of Flow Electrification Phenomena in Fuel tanks of Aeronautical Structures," Thése, Universitéde Poitiers, 140 pages, 2006.
Clermont, et al., "Flow Electrification of an Electrically Charged Liquid," *International Journal of Plasma Enviromental Science & Technology*, vol. 10, No. 2, pp. 125-130, Dec. 2016.
C-Motive Technologies, "Electric Motors Built for the $21^{st}$ Century," Handout, www.c-motive.com, 2 pages, 2019.
Colgate, et al., "Linear Electrostatic Acuators: Gap Maintenance via Fluid Bearings," *Robotics & Computer-Integrated Manufacturing*, vol. 10, No. 5, pp. 365-376, 1993.
Cookson, "Review of High-Voltage Gas Breakdown and Insulators in Compressed Gas," *IEE Proc.*, vol. 128, Pt. A, No. 4, pp. 303-312, May 1981.
Crain, "Multilayer Electret Activated by Direct Contact Silicon Electrode," *Thesis*, 160 pages, Dec. 2014.
Crain, et al., "Formation of $SiO_2/Si_3N_4/SiO_2$ Positive and Negative Electrets on Silicon Substrate," *Journal of Microelectromechanical Systems*, vol. 25, No. 6, pp. 1041-1049, Dec. 2016.
Defense Documentation Center, "Dynamic Shaft Seals in Space," *Missile and Space Division*, Space Power and Propulsion Section, 116 pages, 1963.
Denat, "Conduction and Breakdown Initiation in Dielectric Liquids," *French National Centre for Scientific Research*, 11 pages, Jun. 2011.
Denissov, et al., "Dielectric Stength of Different Gases in GIS," *Gunset User*, 5 pages, 2011.
Dhar, et al., "Superior Dielectric Breakdown Strength of Graphene and Carbon Nantube Infused Nano-Oils," *IEEE Transactions on Dielectrics and Electrical Insulation*, 14 pages, 2018.
DuPont, "Teflon PTFE Fluoropolymer Resin," *Properties Handbook*, 38 pages, date unknown.
Eagle Burgmann, "Mechanical Seal and Technology and Selection," *Brochure*, 58 pages, 1977.
Emmerich et al., "Real-Space Measurement of Potential Distribution in PECVD ONO Electrets by Kevin Probe Force Microscopy," *Nanotechnology*, vol. 27, 10 pages, 2016.
European Patent Office as the International Searching Authority, Authorized Officer: Véronique Cornudet, Invitation to Pay Additional Fees and, Where Applicable, Protest Fee (partial International Search Report), PCT/US2019018290, 15 pages, dated May 29, 2019.
"Electrical Properties of the FLUTEC Liquids," *F2 Chemicals Ltd.*, Technical Article, www.f2chemicals.com, 5 pages, 2006.
"Experts in Fluorination," *F2 Chemicals, Ltd.*, www.f2chemicals.com; 1 page; 2017.
Felici, "Ten Years of Research on Electrostatics at the University of Grenoble 1942-1952," *British Journal of Applied Physics*, Supplement No. 2, pp. S62-S67, 1953.
Felici, N.J., "Ten Years of Research on Electrostatics at the University of Grenoble 1942-1952," *British Journal of Applied Physics*, vol. 4, pp. S62-S67, Dec. 2002.
Ferrotec, "Ferrofluidic Seals & Vacuum rotary Feedthrough Solutions," *Standard Products Catalog*, 95 pages, 2012.
Fofana, "50 Years in the Development of Insulating Liquids," *DEIS*, vol. 29, No. 5, pp. 13-25, 2013.
Forster, et al., "The Effect of the Electrode Gap on Breakdown in Liquid Dielectrics," *IEEE Transactions on Dielectrics and Electrical Insulation*, vol. 1, No. 3, pp. 440-446, Jun. 1994.
Foussier, Philippe, Authorized Officer EPO as the ISA, International Search Report and Written Opinion of the International Searching Authority, PCT/US19/18290, 19 pages, Sep. 9, 2019.
Fréchette, et al., "An Electrostatic Induction Micromotor Supported on Gas-Lubricated Bearings," *IEEE*, pp. 290-293, 2001.
Fromille, et al., "Super Dielectric Materials," *MDPI*, 22 pages, 2014.
Fu, et al., "Hydroxyapatite Thin Films with Giant Electrical Polarization," *Chemistry of Materials*, pp. 1164-1171, 2015.
Gabriel, et al., "Design Considerations for a Practical Electrostatic Micro-Motor," *Sensors and Acuators*, vol. 11, pp. 189-206, 1987.
Ge, et al., "Design Concepts for a Fluid-Filled Three-Phase Axial-Peg-Style Electrostatic Rotating Machine Utilizing Variable Elastance," *IEEE Trans. on Industry Applications*, vol. 52, No. 3, pp. 2156-2166, May/Jun. 2016.
Ge, et al., "Dielectric Liquids for Enhanced Field Force in Macro Scale Direct Drive Electrostatic Actuators and Rotating Machinery," *IEEE Transactions on Dielectrics and Electrical Insulation*, vol. 23, No. 4 pp. 1924-1934, Aug. 2016.
Ge, et al., "A 3D Printed Fluid Filled Variable Elastance Electrostatic Machine Optimized with Conformal Mapping,", *IEEE*, 8 pages, 2015.
Ge, et al., "A 1-Phase 28-Pole Axial Peg Style Electrostatic Rotating Machine Utilizing Variable Elastance," *IEEE*, pp. 604-610, 2015.
Ge, et al., "Three-Dimensional Printed Fluid-Filled Electrostatic Rotating Machine Designed with Conformal Mapping Methods," *IEEE Transactions on Industry Applications*, No. 53, No. 5, pp. 4348-4359, Sep./Oct. 2017.
Genda, et al., "High Power Electrostatic Motor and Generator Using Electrets," *The $12^{th}$ International Conference on Solid State Sensors, Actuators and Microsystems*, pp. 492-492. Jun. 2003.
Genda, et al., "High Power Electret Motor and Generator on Shrouded Turbine," *The $4^{th}$ International Workshop on Micro and Nanotechnology for Power Generation and Energy Conversion Applications*, pp. 183-186, Nov. 2004.
Genda, et al., "High Power Electrostatic Motor with Micro Patterned Electret on Shrouded Turbine," *Transducers '05*, pp. 709-712, Jun. 2005.

(56) References Cited

OTHER PUBLICATIONS

Given, et al., "The Influence of Magnetite Nano Particles on the Behaviour of Insulating Oils for Pulse Power Applications," *IEEE*, pp. 40-43, 2011.
Glor, et al., "Ignition Hazards Caused by Electrostatic Charges in Industrial Processes," *Thurba Ltd.*, 3 pages, Feb. 2015.
Go, et al., "A Mathematical Model of the Modified Paschen's Curve for Breakdown in Microscale Gaps," *Journal of Applied Physics*, vol. 107, 10 pages, 2010.
Groves, "Vacuum is a Dielectric. Where Does the Impedance to Charge Flow Come From?" *Physics and Astronomy Online*, (PhysLink. com), 4 pages, Feb. 21, 2018.
Gundfos, "Shaft Seals," *Grundfos Data Booklet*, pp. 1-64, 2016.
Gundfos, "Mechanical Shaft Seals for Pumps," *Literature, Grundfos Management A/S*, 107 pages, 2009.
Halamata, et al., "OHA Ceramic Electret for Vibration Energy Harvesting," *PowerMEMS 2017*, 5 pages, 2018.
Hemmer, et al., "Investigation of the Stability of Commercially Available Bio-Oils as Insulating Liquid," *2003 Annual Report Conference on Electrical Insulation and Dielectric Phenomena*, pp. 64-67, 2003.
Hexane, "Electrostatic Motors," www.douglas-self.com; 4 pages, Oct. 26, 2017.
Hirschberg, et al., "Electret Films with Extremely High Charge Stability Prepared by Thermal Evaporation of Teflon AF" *Organic Electronics*, vol. 57, pp. 146-150, 2018.
Hoen, et al., "Electrostatic Surface Devices: Theoretical Considerations and Fabrications," *Transducers '97*, pp. 41-44, Jun. 1997.
Hofz, "A Survey of Actuator Shaft Sealing Techniques for Extended Space Missions," *Technical Memorandum* 33-587, 38 pages, Dec. 15, 1972.
Hopf, et al., "Dielectric Strength of Alternative Insulation Gases at High Pressure Streamer Influence on Paschen's Law at High Pressure," *Research Gate*, 6 pages, 2015.
Husain, et al., "Analysis of Paschen Curves for Air, $N_2$ and $SF_6$," *IEEE Transactions on Electrical Insulation*, vol. I-17, No. 4, pp. 350-353, Aug. 1982.
Jacobs, et al., "Submicrometer Patterning of Charge in Thin-Film Electrets," *Science*, vol. 291, pp. 1763-1766, Mar. 2001.
Jadidian, "Charge Transport and Breakdown Physics in Liquid/Solid Insulation Systems," Thesis, University of Tehran, MIT, 220 pages, Jun. 2013.
Jefimenko, "Slot Effect in Electret Devices," *Dept. of Physics, West. VA Unv.*, pp. 345-348, 1968.
Jefimenko, et al., "Electrostatic Current Generator Having a Disk Electret as an Active Element," *IEEE Trans. on Industry Applications*, vol. 1A-14, Nov. 6, pp. 537-540, Nov./Dec. 1978.
Jefimenko, et al., "Electret Electrometers," *Proceedings of the West Virginia Academy of Science*, vol. 45, No. 3, 8 pages, 1973.
Jefimenko, et al., "Force Measurements on Electret," *Proceedings of the West Virginia Academy of Science*, vol. 40, pp. 338-344, 1968.
Jefimenko, et al., Conference on "Dielectric Materials, Measurements and Applications," *The Institute of Electrical Engineers*, 5 pages, Jul. 20-24, 1970.
Jefimenko, O., "Electrostatic Motors—Their History, Types, and Pinciples of Operation," *Electret Scientific Company*, 149 pages, 1973.
Jenkins, "Optimal Super Dielectric Material," *Calhoun: The NPS Institutional Archive*, Theses and Dissertations, 74 pages, Sep. 2015.
Jin, et al., "AC Breakdown Voltage and Viscosity of Mineral Oil based $SiO_2$ Nanofluids," *IEEE*, pp. 902-905, 2012.
Johnson, W., "Design and Analysis of Macro Switched Impedance Motors," *Theses and Dissertations—Electrical and Comptur Engineering*, University of Kentucky, 145 pages, 2011.
Jones, "Lumped Parameter Electromechanics of Electret Transducers," *IEEE Transactions on Acoustics, Speech, and Signal Processing*, vol. 23, Issue 5, pp. 498-500, Oct. 1975.
Jones, "Lumped Parameter Electromechanics of Electret Transducers," *IEEE Transactions on Acoustics, Speech, and Signal Processing*, pp. 141-145, Apr. 1974.

Kachroudi, et al., "Annealing for the Improvement of the Capabilities of Paraylene C as Electret," *Journal of Applied Science*, 9 pages, 2018.
Kao, "Dielectric Phenomena in Solids," *Elsevier Academic Press*, 601 pages, 1973.
Kao, "Theory of High-Field Electric Conduction and Breakdown in Dielectric Liquids," *IEEE Transactions on Electrical Insulation*, vol. E1-11, No. 4, pp. 121-128, Dec. 1976.
Kao, et al., "Electric Breakdown in Transformer Oil Between Electrodes Coated with Thin Insulating Films," *IEEE*, pp. 191-194, 1970.
Katiyar, et al., "Enhanced Dielectric Breakdown Performance of Anatase and Rutile Titania Based Nano-Oils," *IEEE*, 28 pages, 2016.
Kaya, et al., "Design of a New Non-Contact Screw Seal and Determination of Performance Characteristics," *Proceedings of the World Congress on Momentum, Heat and Mass Transfer*, pp. 1141-1-114-7, Apr. 2016.
Kelly, "What is the Most Effective Way to Commutate a BLDC Motor?" *Digi-Key Electronics*, 5 pages, Feb. 16, 2017.
Kobayasi, "Design of an Asynchronous Electrostatic Motor," *American Institute of Physics*, vol. 61, 4 pages, 1990.
Koch, "Prediction of Breakdown Voltages in Novel Gases for High Voltage," Research Collection, Doctoral Thesis, 172 pages, 2015.
Kolomiets, et al., "Vortex Focusing of Ions Produced in Corona Discharge," *Talanta*, vol. 110, pp. 39-45, 2013.
Kolomiets, et al., "Focusing Ions by Vortex Jet at Atmosheric Pressure," *Technical Physics Letters*, vol. 37, No. 5, pp. 465-468, 2011.
Kotrappa, "Long Term Stability of Electrets Used in Electret Ion Chambers," *Journal of Electrostatics*, vol. 66, pp. 407-409, 2008.
Krasucki, "Electrical Breakdown of Dielectric Liquids," *Electrical Research Association*, pp. 96-102, 1971.
Kremer, et al., "A Novel Method for the Collimation of Ions at Atmospheric Pressure," *J. Phys. D: Appl. Phys.*, vol. 39, pp. 5008-5015, 2006.
Kumar, et al., "A Perturbation Method for Calculating the Capacitance of Electrostatic Motors," *J. Micromech. Microeng.*, pp. 1-9, 1991.
Kunhardt, et al., "The Liquid State and It's Electrical Properties," *NATO ASI Series*, 581 pages, 1987.
Kupracz, et al., "Influence of Forming Temperature of Electrostatic Parameters of Electrets," *European Union*, 4 pages 2018.
Kupracz, et al., "Optimization of Electret Film Forming Method," *IOP Conference Series: Materials Science and Engineering*, vol. 113, 6 pages, 2016.
Leask, "Pulse Breakdown Strengths of Liquid, Gel and Solid Insulating Materials Using Closely Spaced Spherical Electrodes," *ACTA Physica Polonica IA*, vol. 115, No. 6, pp. 998-1000, 2009.
Leonard "Generation of Electrostatic Charge in Fuel Handling Systems: A Literature Survey," *NRL Report 8484*, 57 pages, Sep. 24, 1981.
Leonov, et al., "Stabilization of Positive $SiO_2/Si_3N_4$ Electrets," *IEEE Transactions on Dielectrics and Electrical Insulation*, vol. 13, No. 5, pp. 1049-1056, Oct. 2005.
Leonov, et al., "Charge Retention in a Patterned $SiO_2/Si_3N_4$ Electret," *IEEE Sensors Journal*, vol. 13, No. 9, pp. 3369-3376, Sep. 2013.
Leonov, et al., "Multilayer Inorganic Electrets with $SiO_2$ and $Si_3N_4$ Layers for Applications on Heated Machinery," *Hindawi Publishing Corp.*, vol. 2012, 10 pages, 2012.
Leonov, et al., "Patterning of Inorganic Electrets," *IEEE Transactions on Dielectrics and Electrical Insulation*, pp. 994-1000, Sep. 2010.
Liu, et al., "A Brief Review of Actuation at the Micro-Scale Using Electrostatics Electromagnetics and Piezoelectric Ultrasonics," *Acoust. Sci & Tech.*, vol. 31, No. 2, pp. 115-123, 2010.
Liu, et al., "Charging and Characterization of Non-Patterned Organic Micro Electret Arrays," *Journal of Micromechanics and Microengineering*, vol. 24, 10 pages, 2014.
Loveless, et al., "A Universal Theory for GAs Breakdown from Microscale to the Classical Paschen Law," *American Institute of Physics*, vol. 24, 16 pages, 2017.

(56) References Cited

OTHER PUBLICATIONS

Lu, et al., "PECVD SiO$_2$/Si$_3$N$_4$ Double Layers Electrets on Glass Substrates," *IEEE Transactions on Dielectrics and Electrical Insulation*, vol. 15, No. 4, pp. 915-919, 2008.
Lucas, "Breakdown of Gaseous Insulation," *High Voltage Engineering*, 21 pages, 2001.
Ludois, "Sustainable Approaches for Electric Motors Are Aluminum and Dielectric Motors Possible?" *WEMPEC*, 58 pages, 2017.
Ludois, et al., "Evaluation of Dielectric Fluids for Macro-Sale Electrostatic Actuators and Machinery," *IEEE*, pp. 1457-1464, 2014.
Lv, et al., "Nanoparticle Effect on Dielectric Breakdown Strength of Transformer Oil-Based Nanofluids," *2013 Annual Report Conference on Electrical Insulation and Dielectric Phenomena*, pp. 680-682, 2012.
Lyon, et al., "Couette Charger for Measurement of Equilibrium and Energization Flow Electrification Parameters: Application to Transformer Insulation," *IEEE Transactions on Electrical Insulation*, vol. 23, No. 1, pp. 159-176, 1998.
Mahanta, et al., "Electrical Insulating Liquid: A Review," *Journal of Advanced Dielectrics*, vol. 7, No. 4, 9 pages, 2017.
Martin, "Microscopic Fields in Liquid Dielectrics," *The Journal of Chemical Physics*, vol. 129, 15 pages, 2008.
Martin, "Comparison of Breakdown Voltages for Various Liquids Under One Set of Conditions," *Dielectric Strength Notes*, 3 pages, Nov. 1965.
Martin, "Nanosecond Pulse Techniques," *Proceedings of the IEEE*, vol. 80, No. 6, pp. 934-945, Jun. 1992.
Massarczyk, et al., "Paschen's LAw Studies in Cold Gases," *IOPScience*, pp. 1-9, 2017.
McCarty, et al., "Electrostatic Charging Due to Separation of Ions at Interfaces: Contact Electrification of Ionic Electrets," *Agnew. Chem. Int. Ed.*, vol. 47, pp. 2188-2207, 2008.
Megger, "The Megger Guide to Insulating Oil Dielectric Breakdown Testing," *Megger Limited*, 34 pages, 2013.
Moeny, "Development of a High Dielectric Constant Insulating Oil," *IEEE*, pp. 1141-1141, 2005.
Mulligan, "Handling Flammable Liquids," *CEP Magazine*, pp. 48-56, Jul. 2003.
National Academy of Sciences, "Digest of Literature on Dielectrics," *The National Academies Press*, vol. 28, 372 pages, 1964.
Ni, et al., "Evaluation of the Martin Empirical Formulae for Transformer Oil: Statistical Meaning of the Time Parameter," *2017 Electrical Insulation Conference*, pp. 92-95, Jun. 2017.
Niino, et al., "High-Power and High Efficiency Electrostatic Actuator," *IEEE*, pp. 236-241, 1993.
Nyberg, "3M™ Novec™ Dielectric Fluids SF$_6$ Alternatives for Power Utilities," *3M Science*, 20 pages, Jan. 2017.
Okubo, et al., "Charging Efficiencies and Heat Resistance in Three Types of SiO$_2$/Si$_3$N$_4$ Electrets," *IEEE Transactions on Dielectrics and Electrical Insulation*, vol. 22, No. 6, pp. 3663-3667, Dec. 2015.
Olthuis, et al., "On the Charge Storage and Decay Mechanism in Silicon Dioxide," *MESA Research Institute*, pp. 16-26, 1991.
Olthuis, et al., "On the Charge Storage and Decay Mechanism in Silicon Dioxide Electrets," *IEEE Transactions on Electrical Insulation*, vol. 27, No. 4, pp. 691-697, Aug. 1992.
Otsubo, et al., "Dielectric Fluid Motors," *American Institute of Physics*, vol. 71, No. 3, 3 pages, Jul. 1997.
Paillat, et al., "High Power Transformers Failures due to Flow Electrification: Tools for Understanding the Electrostatic Hazard," *Conf. Presentation*, Session 1, Paper 5, pp. 1-6, 2009.
Parker, "Rotary Seals," *Rotary Seal Design Guide*, Catalog EPS 5350/USA, 434 pages, Mar. 2006.
Philip, "The Vacuum-Insulated, Varying-Capacitance Machine," *IEEE Transactions on Electrical Insulation*, vol. EI-12, No. 2, pp. 130-136, Apr. 1977.
Philip, et al., "Compressed Gas Insulation for Electric Power Transmission," Conference on Electrical Insulation & Dielectric Phenomena—Annual Report 1996, *IEEE*, pp. 100-104, Oct. 3, 1966.
Primo, et al., "Applicability of Nanodielectric Fluids to the Improvement of Transformer Insulation Properties," *IEEE*, 4 pages, 2016.
Primo, et al., "Improvement of Transformer Liquid Insulation Using Nanodielectric Fuids: A Review," *IEEE*, vol. 34, No. 3, pp. 13-26, 2018.
Rafiq, et al., "A Review on Properties, Opportunities, and Challenges of Transformer Oil-Based Nanofluids," *Journal of Nanomaterials*, vol. 2016, 23 pages, 2015.
Ramu, "On the Evaluation of Conductivity of Mixtures of Liquid Dielectrics," *IEEE Transactions on Electrical Insulation*, vol. EI-8, No. 2, pp. 55-60, Jun. 1973.
Roos, "Electrets, Semipermanently Charged Capacitors," *Journal of Applied Physics*, vol. 40, No. 8, pp. 3135-3139, 1969.
Rychkov, et al., "Electret Properties of Polyethylene and Polytetrefluoroethylene Films with Chemically Modified Surface," *IEEE*, pp. 8-14, 2011.
Rychkov, et al., "Triboelectrification and Thermal Stability of Positive Charge on Polytetrafluoroehtylene Electret Films," *IEEE*, pp. 658-660, 2012.
Salvage, "The Dielectric Breakdown of Some Simple Organic Liquids," *Monograph*, No. 2, pp. 15-22, 1950.
Sanborn, et al., "Compressed Gas Insulation for Electric Power Transmission," Conference on Electrical Insulation & Dielectric Phenomena—Annual Report 1966, IEEE, pp. 100-104, Oct. 3, 1966.
Scharnberg, et al., "Evaporated Electret Films with Superior Charge Stability Based on Teflon AF 2400," *Organic Electronics*, vol. 70, pp. 167-171, 2019.
Scheeper, et al., "Investigation of Attractive Forces Between PECVD Silicon Nitride Microstructures and an Oxidized Silicon Substrate," *Sensors and Actuators A*, vol. 30, pp. 231-239, 1992.
Schmidt, "Electrical Breakdown of Liquid Hydrocarbons in a Test Cell with One Rotating Electrode," *IEEE*, vol. 24, No. 2, pp. 179-183, Apr. 1989.
Schmidt, "Elementary Process in the Development of the Electrical Breakdown of Liquids," *IEEE Transactions on Electrical Insulation*, vol. E1-17, No. 6, pp. 478-483, Dec. 1982.
Schmidt, et al., "Electrical Breakdown of n-Hexane in a Test Cell With One Rotating Electrode," *IEEE*, pp. 33-36, 1985.
Schmidt, et al., "Fixed Charge Density in Silicon Nitride Films on Crystalline Silicon Surfaces Under Illumination," *IEEE*, pp. 162-165, 2002.
Schoenbach, et al., "Electrical Breakdown of Water in Microgaps," *Plasma Sources Science and Technology*, vol. 17, No. 2, May 2008.
Secker, et al., "A Miniature Multipole Liquid-Immersed Dielectric Motor," *Journal of Physics D.: Applied Physics*, pp. 216-220, 1970.
Sessler, "Electrets," *Topics in Applied Physics*, Second Enlarged Edition, 459 pages, 1987.
Setsuhara, et al., "Novel Structured Metallic and Inorganic Materials," *Springer*, eBook, 602 pages, 2019.
Sharbaugh, et al., "The Dependence of the Measured Electric Strengths of Liquid on Electrode Spacing," *General Electric Research Laboratory*, pp. 16-18, 1953.
Sharbaugh, et al., "The Electric Strength of Hexane Vapor and Liquid in the Critical Region," *Journal of Applied Physics*, vol. 48, No. 3, pp. 943-950, 1977.
Shell, "Inhibited Electrical Insulating Oil," *Technical Paper, Shell Lubricants*, 2 pages, Oct. 2011.
Shinsei Corp., "High Power Electrostatic Motor," www.shinsei-motor.com; pp. 1-5, Sep. 29, 2017.
Sletten, "Electric Breakdown in n-Hexane," *IEEE*, pp. 67-70, 1960.
Sohrabi, et al., "Modified Single Point-to-Plane Corona Poling Rotating System for Production of Electret Dosimeters," *IEEE Transactions on Dielectrics and Electrical Insulation*, vol. 25, No. 2, pp. 448-456, Apr. 2018.
Stong, C.L., "Electrostatic Motors Are Powered by Electric Field of the Earth," *The Amateur Scientist*, 8 pages, Oct. 1974.
Strong, "Electrostatic Motors are Powered by Electric Field of the Earth," *The Amateur Scientist*, pp. 1-8, Oct. 1974.
Tada, "Improvement of Conventional Electret Motors," *IEEE Transactions on Electrical Insulation*, vol. 28, No. 3, pp. 402-410, Jun. 1993.

(56) References Cited

OTHER PUBLICATIONS

Tada, "Reviewing the Forces of Electret Motors by Applying Maxwell Stress Tensors and Delta Function," *Jpn. J. Appl. Phys.*, vol. 34, pp. 1595-1600, 1995.
Tada, "Theoretical Characteristics of Generalized Type Electret Generator Employing Polymer Film Electrets," *Proc. 5th Intern. Symp. Electrets*, pp. 7500-755, 1985.
Tanaka, et al., "Polarization and Microstructural Effects of Ceramic Hydroxyapatite Electrets," *Journal of Applied Physics*, vol. 107, 11 pages, 2010.
Tenebaum, "A Tabletop Motor Using an Entirely new Driving Principle," *PhysOrg*, 3 pages, Sep. 2014.
Thielemann, et al., "Miniaturized Inorganic Electret Layers,"*IEEE*, Conference Paper, pp. 1022-1027, 1994.
Thyssen, et al., "Electret Stability Related to the Crystallinity in Polypropylene," *IEEE Transactions on Dielectrics and Electrical Insulation*, vol. 24, No. 5, pp. 3038-3046, Oct. 2017.
Timoshkin, et al., "Dielectric Properties of Diala D, MIDEL 7131 and THESO Insulating Liquids," *2008 Annual Report Conference on Electrical Insulation Dielectric Phenomena*, pp. 622-625, 2008.
Timoshkin, et al., "Mixtures of Insulating Liquids for Pulsed Power Applications," *IEEE*, pp. 155-158, 2010.
TRASK Instrumentation, Inc., Conductivity Chart, www.traskinstrumentation.com; 11 pages, date unknwon.
Trump, "Vacuum Electrostatic Engineering," *MIT*, 147 pages, 1993.
Tsutsumino, et al., "Seismic Power Generator Using High-Performance Power Electret," *MEMS*, vols. 22-26, pp. 98-101, Jan. 2006.
U.S. Department of Energy, "Extend the Operating Life of Your Motor," *U.S. Dept. of Energy*, Advanced Manufacturing Office, Motor Systems Tip Sheet #3, 2 pages, Nov. 2012.
Vertrel™ XF, "Specialty Fluid," *Technical Information*, 4 pages; 2017.
Wang, "Invisible Surface Charge Pattern on Inorganic Electrets," *IEEE Electron Device Letters*, vol. 34, No. 8, pp. 1047-1049, Aug. 2013.
Wang, et al., "The Impact of TiO2 nanoparticle Concentration Levels on Impulse Breakdown Performance of Mineral Oil-Based Nanofluids," *Nanomaterials*, pp. 1-13, 2019.
Wang, et al., "Inorganic Electret with Enhanced Charge Stability for Energy Harvesting," *IEEE*, pp. 207-210, Apr. 2013.
Wintle, "Introduction to Electrets," *Journal of the Acoustical Society of America*, vol. 53, No. 6, pp. 1578-1588, 1973.
Xia, et al., "Charge Storage and Its Dynamics in Porous Polytetrafluoroethylene (PTFE) Film Effects," *IEEE*, pp. 102-108, 2003.
Xu, et al., "Spray Coating of Polymer Electret with Nano Particles for Stable Surface Charge," *Proceedings of the 11th IEEE Annual International*, 6 pages, 2016.
Yang et al., "Resealable, Ultra-Low Leak Micro Valve Using Liquid Surface Tension Sealing for a Vacuum Applications," *Transducers 2017*, pp. 2071-2074, Jun. 2017.
Yang, et al., "A Micro Power Generator Using PECVD $SiO_2/Si_3N_4$ Double-Layer as Electret," *Proceedings of Power MEMS 2008*, pp. 317-320, Nov. 2008.
Yao, et al., "Bio-Assembled Nanocomposites in Conch Shells Exhibit Giant Elecret Hysteresis," *Advanced Materials*, 8 pages, 2012.
Yazdani, et al., "Effect of Charge Mobility on Electric Conduction Driven Dielectric Liquid Flow," *Science Direct*, 6 pages, 2014.
Yeckel, et al., "Pulsed Breakdown Characterizaton of Advanced Liquid Dielectrics for High-Power High-Pressure Rep-Rate Oil Switching," *IEEE*, pp. 860-865, 2009.
Yeckel, et al., "A Comparison of the AC Breakdown Strength of New and Used Poly-x Olefin Coolant," *IEEE Transactions on Dielectrics and Electrical Insulation*, vol. 14, No. 4, pp. 820-824, Aug. 2007.
Zahn, "Magnetic Fluid and Nanoparticle Applications to Nanotechnolgy," *Journal of Nanoparticle Research*, vol. 3, pp. 73-78, Feb. 2001.
Zdanowski, "Influence of Composition of Dielectric Liquid Mixtures on Electrostatic Charge Tendency and Physicochemical Parameters," *IEEE Transactions on Dielectrics and Electrical Insulation*, vol. 15, No. 2, pp. 572-532, Apr. 2008.
Zhang, "Superficial Fluids for High Power Switching," *Thesis*, TU/e Eindhoven University of Technology, 159 pages, 2015.
Zhang, et al., "Electrostatic Micromotor and its Reliability," *Microelectronics Reliability*, vol. 45, pp. 1230-1242, 2005.
Zhang, et al., Experimental Study of the Breakdown Characteristic of Glycerol as Energy Storage Medium in Pulse Forming Line, *2013 Annual Report Conference on Electrical Insulation and Dielectric Phenomena*, pp. 850-853, 2013.
Zhang, et al., "Charge Dynamics in Silicon Nitride/Silicon Oxide Double Layers," *Applied Physics Letters*, vol. 78, No. 18, pp. 2757-2759, Apr. 2001.
Zhao, et al., "Development of a Dielectric-Gas-Based Single-Phase Electrostatic Motor," *IEEE Transactions on Industry Applications*, vol. 55, No. 3, pp. 2592-2600, May/Jun. 2019.
Zhao, et al., "Design and Optimization of Dielectric-Gas-Based Single-Phase Electrostatic Motor," *IEEE*, pp. 3424-3427, 2018.
Zhongfu, "Improved Charge Stability in Polymer Electrets Quenched Before Charging," *IEEE Transactions on Electrical Insulation*, vol. 25, No. 3, pp. 611-615, Jun. 1990.
Zou, et al., "Quantifying the Triboelectric Series," *Nature Communications*, pp. 1-9, 2019.

* cited by examiner

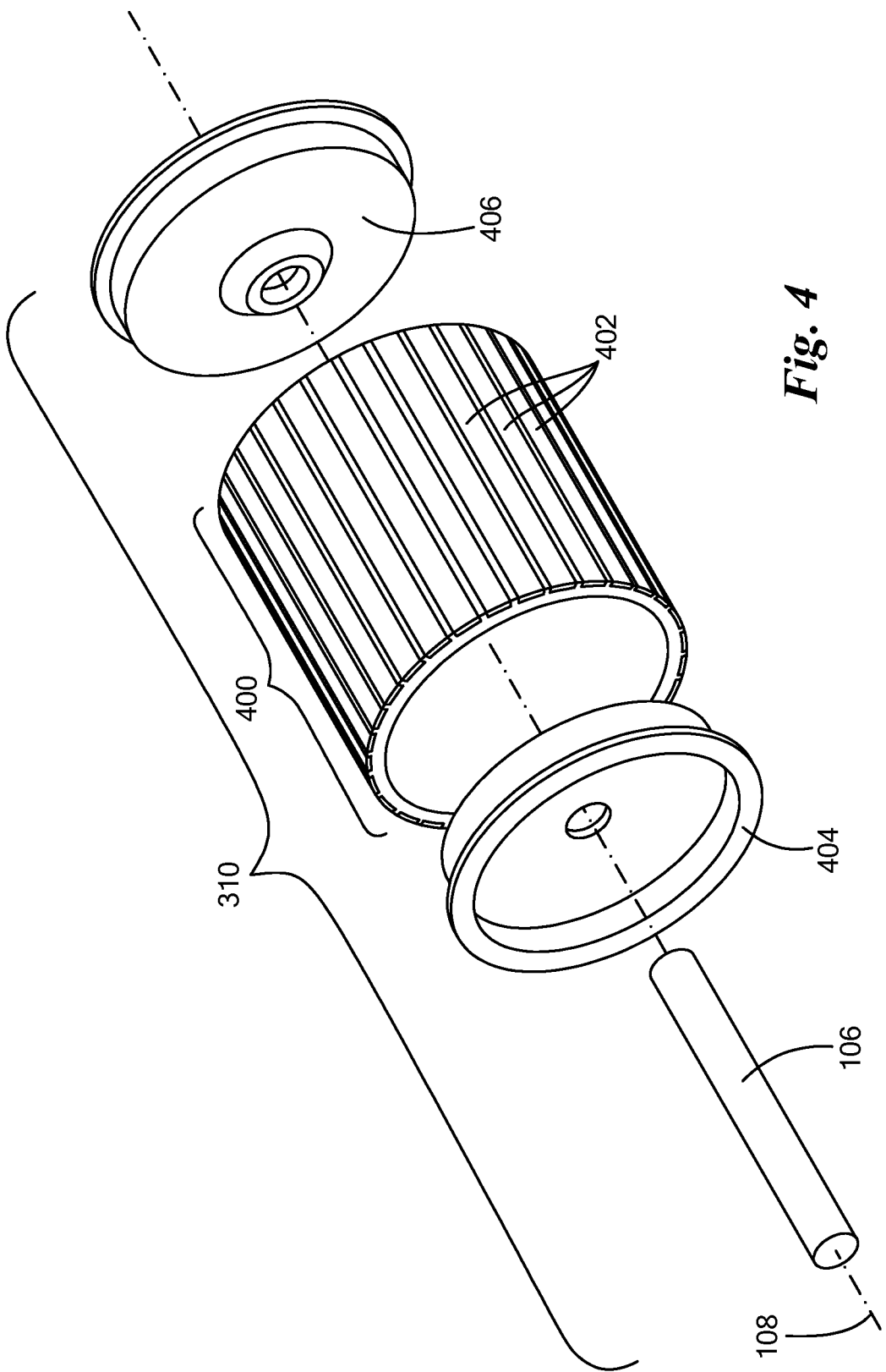

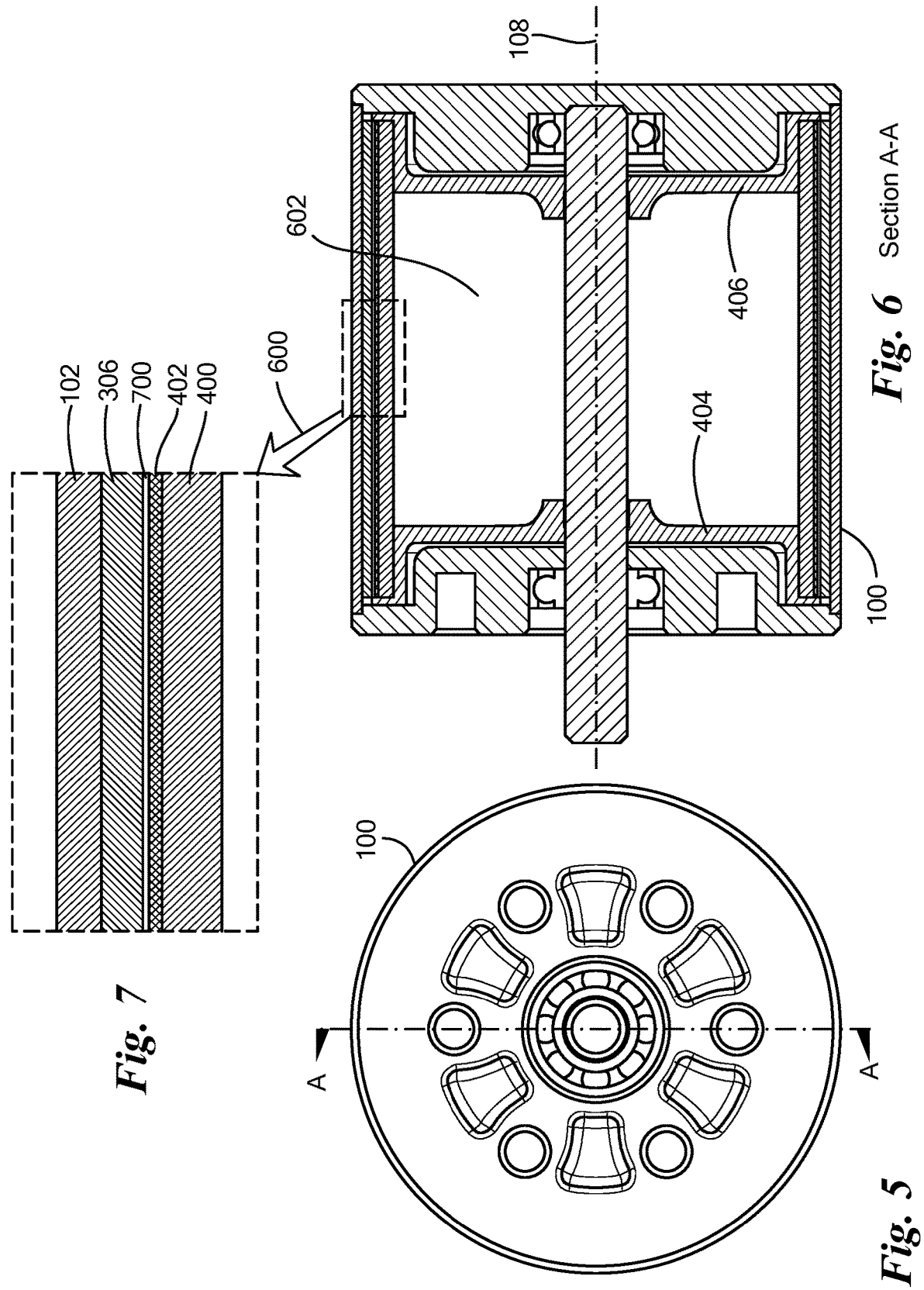

Section B-B

Section C-C

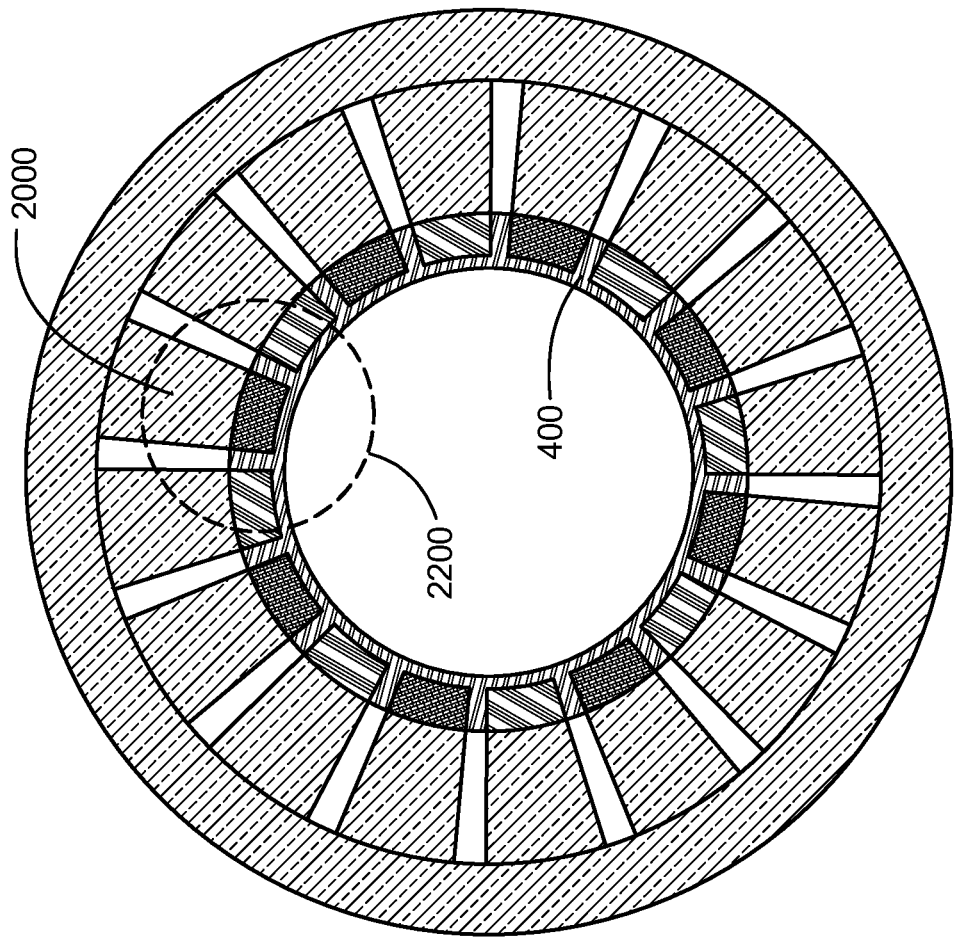
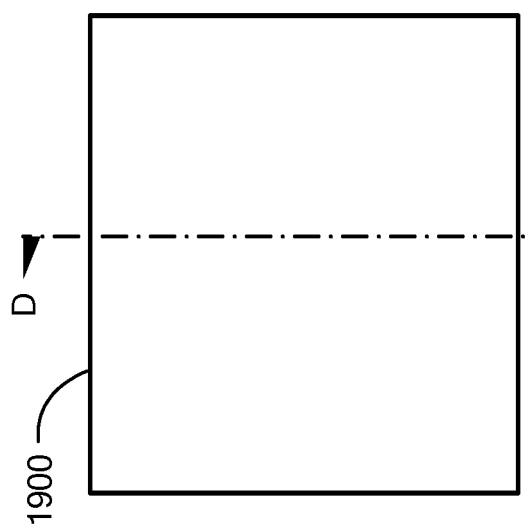
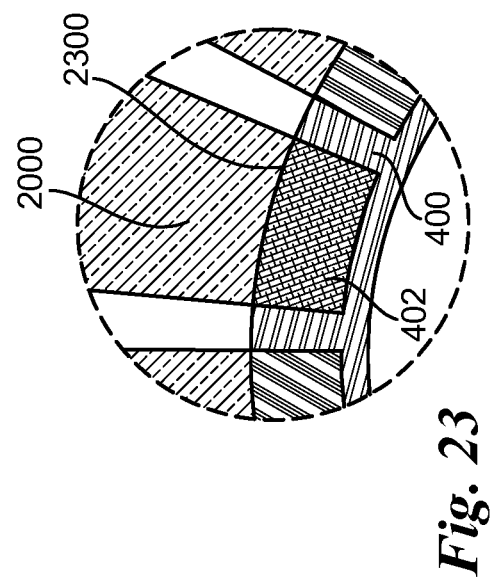
Fig. 21
Fig. 22 Section D-D
Fig. 23

ELECTROSTATIC MOTOR

CROSS REFERENCE TO RELATED APPLICATIONS

This application is a continuation of U.S. patent application Ser. No. 16/277,584, titled "Electrostatic Motor," filed Feb. 15, 2019, and claims priority to U.S. Provisional Patent Application No. 62/631,263, titled "Electrostatically polarized, radial implementation motor," filed Feb. 15, 2018, the entire contents of each of which are hereby incorporated by reference herein, for all purposes.

BACKGROUND

Technical Field

The present invention relates to electrostatic motors and, more particularly, to electrostatic motors having cylindrical rotors separated from cylindrical stators by dielectric fluids and optionally electrets disposed on surfaces of the cylindrical rotors or stators.

Related Art

Various configurations of electrostatic motors have been used since the mid-1700s. However, these motors performed very poorly and largely fell out of favor as much more powerful electromagnetic motors became available. Most electric motors in use today rely on electromagnetic effects to produce torque, whereas electrostatic motors use electrostatic forces. Early efforts at electrostatic motor design are reviewed in by Oleg Jefimenko, "Electrostatic Motors, Their History, Types, and Principles of Operation," ISBN 978-1935023470, Integrity Research Institute, 2011. Notably, Jefimenko and his student Walker explored use of electrets for constructing electrostatic motors, building on the work of Russian physicist A. N. Gubkin, whose work suggested the possibility of an electret-based motor. The electret motors built by Jefimenko and Walker performed well compared to their early predecessors, but very poorly in comparison to conventional electromagnetic electric motors. Their designs were suitable as proofs-of-concept, but suffered from fundamental defects, which made the designs untenable for further commercial development.

Other elements of electret-based electrostatic motors were introduced by Japanese researchers Tada and Genda. However, the electret configurations of these motors were poorly designed. They pursued configurations similar to the Gubkin configuration explored by Jefimenko and Walker. Tada and Genda's motors were limited by the breakdown strength of air.

Other potentially relevant prior art includes U.S. Pat. No. 3,696,258, U.S. Pat. Publ. No. 2006/0006759, U.S. Pat. Nos. 3,433,981 and 8,264,121.

Beginning in the 1980s, several academic groups built MEMS-scale electrostatic motors that did not use electrets. None of these designs can be scaled up to be competitive with conventional electromagnetic motors, as they depend on physical effects suited only to micro-scale construction, inasmuch as they would operate very inefficiently if scaled to dimensions comparable to commercial electric motors.

Recently, Professor Daniel Ludois of the University of Wisconsin founded C-Motive Corporation to commercialize electrostatic motors. The company's electrostatic motor includes interleaved metal pegs or plates, which circulate in a dielectric fluid. See, for example, U.S. Pat. No. 9,479,085, U.S. Pat. Publ. No. 2016/0344306 and U.S. Pat. Publ. No. 2016/0099663.

Prior art electrostatic motors, even prior art electrostatic motors that include electrets or dielectric fluids, suffer from various problems, such as high weight, low maximum rotation rate, very large volumes of dielectric fluid and power supplies requiring very high voltages.

SUMMARY OF EMBODIMENTS

An embodiment of the present invention provides an electrostatic motor. The electrostatic motor includes a rotor, a stator and a dielectric. The rotor is rotatable about a rotation axis. The rotor defines a first cylindrical surface. The first cylindrical surface has a longitudinal axis, which is coincident with the rotation axis. The rotor has a first plurality of charge members disposed circumferentially on the first cylindrical surface. The first plurality of charge members is disposed circumferentially on the first cylindrical surface. As discussed herein, each charge member of the first plurality of charge members may include an electret, an electrode or both an electret and an electrode.

The stator defines a second cylindrical surface. The second cylindrical surface counterfaces the first cylindrical surface. The second cylindrical surface is spaced apart from the first cylindrical surface. The second cylindrical surface is parallel to the first cylindrical surface, and the second cylindrical surface registers with the first cylindrical surface. The stator has a second plurality of charge members disposed circumferentially on the second cylindrical surface. The second plurality of charge members is disposed circumferentially on the second cylindrical surface. As with the first plurality of charge members, each charge member of the second plurality of charge members may include an electret, an electrode or both an electret and an electrode.

One surface of the first and second cylindrical surfaces is an outside cylindrical surface, and the other surface of the first and second cylindrical surfaces is an inside cylindrical surface. That is, the stator may define an inside cylindrical surface that defines a volume, and the rotor may include a cylinder that fits within the volume defined by the stator's inside cylindrical surface. Conversely, the rotor may define an inside cylindrical surface that defines a volume, and the stator may include a cylinder that fits within the volume defined by the rotor's inside cylindrical surface. In either case, the first and second surfaces define a cylindrical shell therebetween.

The cylindrical shell has a finite, non-zero thickness, i.e., the space between the rotor's cylindrical surface and the stator's cylindrical surface. The rotor's cylindrical surface does not touch the stator's cylindrical surface. The dielectric fills the cylindrical shell. The dielectric takes the shape of a cylindrical shell.

In any embodiment, the dielectric may include a dielectric fluid.

In any embodiment, the dielectric fluid may be pressurized to greater than about 101 kPa absolute pressure.

In any embodiment, the electrostatic motor may include means for pressurizing the dielectric fluid to greater than about 101 kPa absolute pressure.

In any embodiment, the electrostatic motor may include a filter in fluid communication with the cylindrical shell and a pump configured to circulate the dielectric fluid from the cylindrical shell, through the filter and then back to the cylindrical shell.

In any embodiment, at least one surface of the first and second cylindrical surfaces may define a plurality of features that extend proud of the at least one surface. In any embodiment, the each feature of the plurality of features may include a chevron shape.

In any embodiment, the dielectric may include a partial vacuum.

In any embodiment, one plurality of charge members of the first and second pluralities of charge members may include a plurality of electrets arranged such that adjacent electrets are of opposite charge, and the other plurality of charge members of the first and second pluralities of charge members may include a first plurality of electrodes.

In any embodiment, charges on adjacent electrets of the plurality of electrets may be sufficient to exceed breakdown voltage of air over a distance equal to spacing between the adjacent electrets.

In any embodiment, the one plurality of charge members further comprises a second plurality of electrodes.

In any embodiment, the electrostatic motor may also include a plurality of charging electrodes, one charging electrode of the plurality of charging electrodes for each respective electret of the plurality of electrets. Each charging electrode may be disposed below, i.e., away from the cylindrical surface, and in intimate contact with, the respective electret.

In any embodiment, the one plurality of charge members of the first and second pluralities of charge members may include a first plurality of electrodes, and the other plurality of charge members of the first and second pluralities of charge members may include a second plurality of electrodes.

In any embodiment, the electrostatic motor may also include an electronic circuit configured to energize and commutate one plurality of charge members of the first and second pluralities of charge members.

In any embodiment, the rotor may define a plurality of first cylindrical surfaces. Each first cylindrical surface may have a respective longitudinal axis coincident with the rotation axis. Each first cylindrical surface may have a first plurality of charge members disposed circumferentially thereon. The stator may define a plurality of second cylindrical surfaces. Each second cylindrical surface may counterface, and be spaced apart from, a corresponding one of the first cylindrical surfaces. Each second cylindrical surface may have a second plurality of charge members disposed circumferentially thereon.

In any embodiment, the electrostatic motor may include a hydrostatic bearing. The hydrostatic bearing may be configured to support the rotor within the stator. The hydrostatic bearing may define a plurality of fluid ports. Each fluid port extends from an outer surface of the stator to an inner surface of the stator. At least some of the fluid ports extend through the second plurality of charge members. One end of each fluid port may be in fluid communication with the cylindrical shell.

Another embodiment of the present invention provides a rotor for an electrostatic motor. The rotor includes a cylinder. The cylinder is rotatable about a rotation axis. The cylinder defines a first cylindrical surface. The first cylindrical surface has a longitudinal axis that is coincident with the rotation axis. The rotor has a plurality of electrets disposed circumferentially on the first cylindrical surface.

The rotor also has a plurality of charging electrodes, one charging electrode of the plurality of charging electrodes for each respective electret of the plurality of electrets. Each charging electrode being disposed below, i.e., away from the cylindrical surface, and in intimate contact with, its respective electret. The plurality of charging electrodes is electrically accessible via at least one electrically conductive port through a surface of the rotor. The port may be at the same level as the cylindrical surface, or the port may be located in a depression in the cylindrical surface. The port may be located on a boss. The port may be located elsewhere on the rotor.

Yet another embodiment of the present invention provides a method of manufacturing a rotor for an electrostatic motor. The method includes forming a plurality of electrets, such that the plurality of electrets is disposed circumferentially on a cylindrical surface of the rotor. The method also includes preventing formation of an air path between adjacent electrets of the plurality of electrets.

In any embodiment, preventing formation of the air path may include applying a dielectric fluid to the cylindrical surface.

In any embodiment, preventing formation of the air path may include forming a partial vacuum around the cylindrical surface.

An embodiment of the present invention provides a fixture for contact charging a cylindrical electret workpiece having a longitudinal axis. The fixture includes a first plurality of spaced-apart electrodes. The first plurality of spaced-apart electrodes is arranged along an imaginary cylindrical surface having a longitudinal axis coincident with the longitudinal axis of the workpiece. All electrodes of the first plurality of spaced-apart electrodes are electrically connected together to form a first circuit. The fixture also includes a second plurality of spaced-apart electrodes arranged along the imaginary cylindrical surface. All electrodes of the second plurality of spaced-apart electrodes are electrically connected together to form a second circuit. The second circuit is electrically isolated from the first circuit. Each electrode of the second plurality of spaced-apart electrodes is disposed between two adjacent electrodes of the first plurality of spaced-apart electrodes.

In any embodiment, the fixture may also include an electrically insulated cylinder disposed around, and in intimate contact with, either an outer surface or an inner surface of the first and second pluralities of spaced-apart electrodes. A longitudinal axis of the electrically insulated cylinder is coincident with the longitudinal axis of the workpiece.

In any embodiment, the fixture may include means for changing diameter of the electrically insulated cylinder, thereby changing diameter of the imaginary cylindrical surface.

In any embodiment, the fixture may include a screw configured to change the diameter of the electrically insulated cylinder, thereby changing the diameter of the imaginary cylindrical surface.

Yet another embodiment of the present invention provides a fixture for contact charging a cylindrical electret workpiece having a longitudinal axis. The fixture includes an electrode assembly that includes a first elongated electrode, a second elongated electrode and an electrically insulated material between the first and the second electrode. The first electrode is electrically isolated from the second electrode. A longitudinal axis of the first electrode is parallel to a longitudinal axis of the second electrode and parallel to the longitudinal axis of the workpiece. The electrode assembly is translatable, between a first position and a second position, along an axis perpendicular to the longitudinal axis of the workpiece. The electrode assembly is configured such that, in the first position, the first and second electrodes are in intimate physical contact with a cylindrical surface of the workpiece. The electrode assembly is configured such that, in the second position, the first and second electrodes are spaced apart from the surface of the workpiece.

In any embodiment, the electrode assembly may be configured such that the cylindrical surface of the workpiece is an outside cylindrical surface of the workpiece.

In any embodiment, the electrode assembly may be configured such that the cylindrical surface of the workpiece is an inside cylindrical surface of the workpiece.

BRIEF DESCRIPTION OF THE DRAWINGS

The invention will be more fully understood by referring to the following Detailed Description of Specific Embodiments in conjunction with the Drawings, of which:

FIG. 4 is an exploded isometric view of a rotor assembly of the electrostatic motor of FIGS. 1-2.

FIG. 5 is an end view, and FIG. 6 is a cross-sectional view of the electrostatic motor of FIGS. 1-3.

FIG. 7 is an enlarged view of a portion of FIG. 6.

FIG. 21 is a side view of the contact charging fixture of FIG. 19.

FIG. 22 is a cross-sectional view through the contact charging fixture of FIG. 21, and FIG. 23 is an enlarged view of a portion of FIG. 22.

DETAILED DESCRIPTION OF SPECIFIC EMBODIMENTS

Definitions

Figure 1:
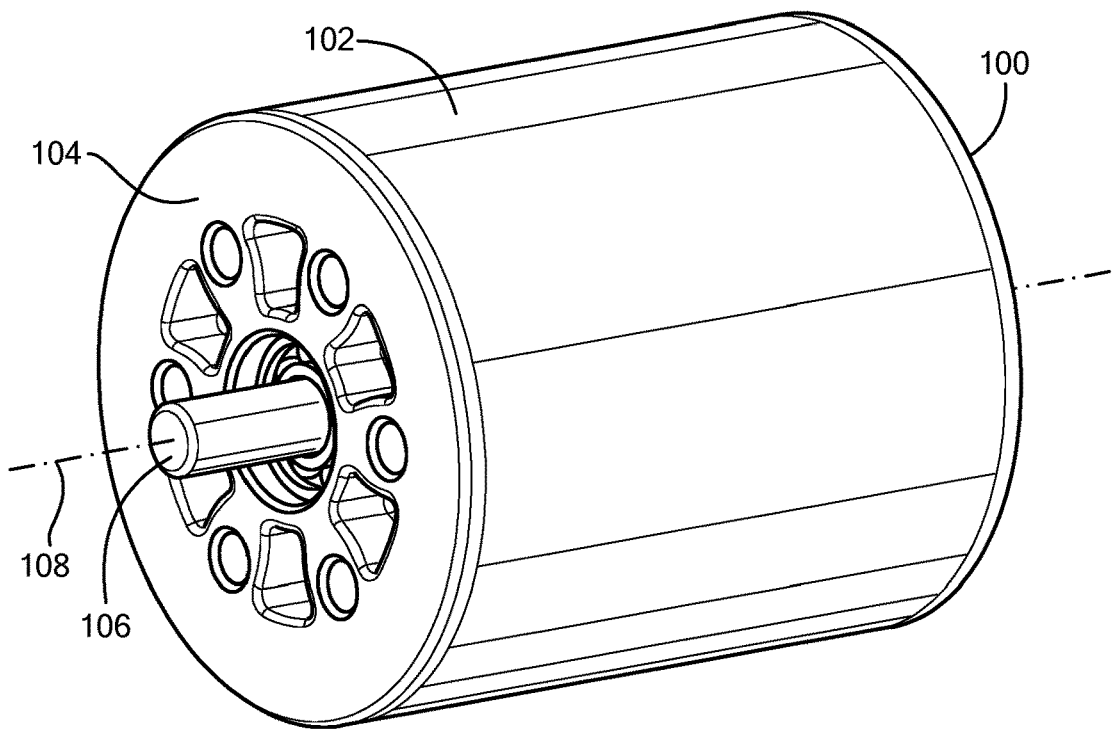
FIG. 1 is an isometric diagram.

As used herein, including in the claims, unless otherwise indicated in context, the following terms shall have the following meanings.

A cylinder (or circular cylinder) is a curvilinear surface, not necessarily a solid. A cylinder is the locus of points traced by a finite-length line segment rotated about an axis, where the line segment is co-planar with the axis, but the line segment is not perpendicular to the axis. The line segment may be straight, curved or formed of a plurality of straight and/or curved sub-segments. If the line segment is parallel to the axis, the cylinder is a conventional right cylinder. If, however, the line segment is not parallel to the axis, the cylinder may be tapered, i.e., shaped like a cone or a portion of a cone.

A circular hollow cylinder (or cylindrical shell) is a three-dimensional region bounded by two circular cylinders having the same axis, two parallel sides and two parallel (not necessarily equal diameter) annular bases perpendicular to the cylinders' common axis.

Commutation is a process of switching electric current and/or voltage in motor phases to generate motion. Brushed motors have physical brushes to achieve this process twice or more per rotation, while brushless direct current (BLDC) electric motors do not. Due to the nature of their design, BLDC motors can have any number of pole pairs for commutation. Similarly, electrostatic motors can have any number of electrodes for commutation.

An electrode is an electrical conductor through which electric current and/or charge enters or leaves an object, substance or region.

An electret is a material that retains a permanent or semi-permanent electric charge after exposure to a strong electric field.

A dielectric (or dielectric material) is an electrical insulator that can be polarized by an applied electric field.

An electrical conductor is a material having an electrical resistivity less than about $10^{-6}$ Ω-m.

An electrical insulator is a material having an electrical resistivity greater than about $10^{-6}$ Ω-m.

A partial vacuum is a region with a gaseous pressure less than about 40 Pa. A partial vacuum is a dielectric.

A fluid is any liquid, gas, supercritical fluid or multiphase mixture of liquid, gas and/or supercritical fluid that has a suitably high dielectric breakdown strength, permittivity and/or low viscosity.

Cylindrical Electrostatic Motor

Embodiments of the present invention provide electrostatic motors that improve upon the efficiency, weight and cost of conventional electromagnetic electric motors and electric motor-driven systems. These embodiments operate more efficiently over a wider range of speeds than conventional electric motors and known electrostatic motors, weigh less and cost less. By operating more efficiently than conventional motors, machines powered by these embodiments are less costly to operate, because they consume less power. The improved efficiency of these embodiments, in combination with their low weight, enable vehicles to travel further and/or bear a larger payload, since a lower volume and mass of batteries, or other energy storage devices, is required. The lower cost and weight of these embodiments is due to the replacement of expensive and heavy materials used in conventional electromagnetic motors, such as magnets, copper wire and electrical steels, with inexpensive, lightweight electret materials and/or thin, conductive electrodes.

These motors can be used to power a wide range of machines that now rely on electromagnetic electric motors. The list of potential applications includes, but is not limited to: vehicles (including primary drivetrain and auxiliary motors for motor vehicles, drones, etc.), aircraft, watercraft (including boats and underwater vehicles), electric tools, robots, manufacturing/material handling equipment, construction equipment, HVAC (heating, ventilation, and air conditioning) equipment, toys and medical devices. The motors are also capable of operating as generators, so they have applications in electricity generation, energy scavenging and hybrid motor/generators.

Figure 2:
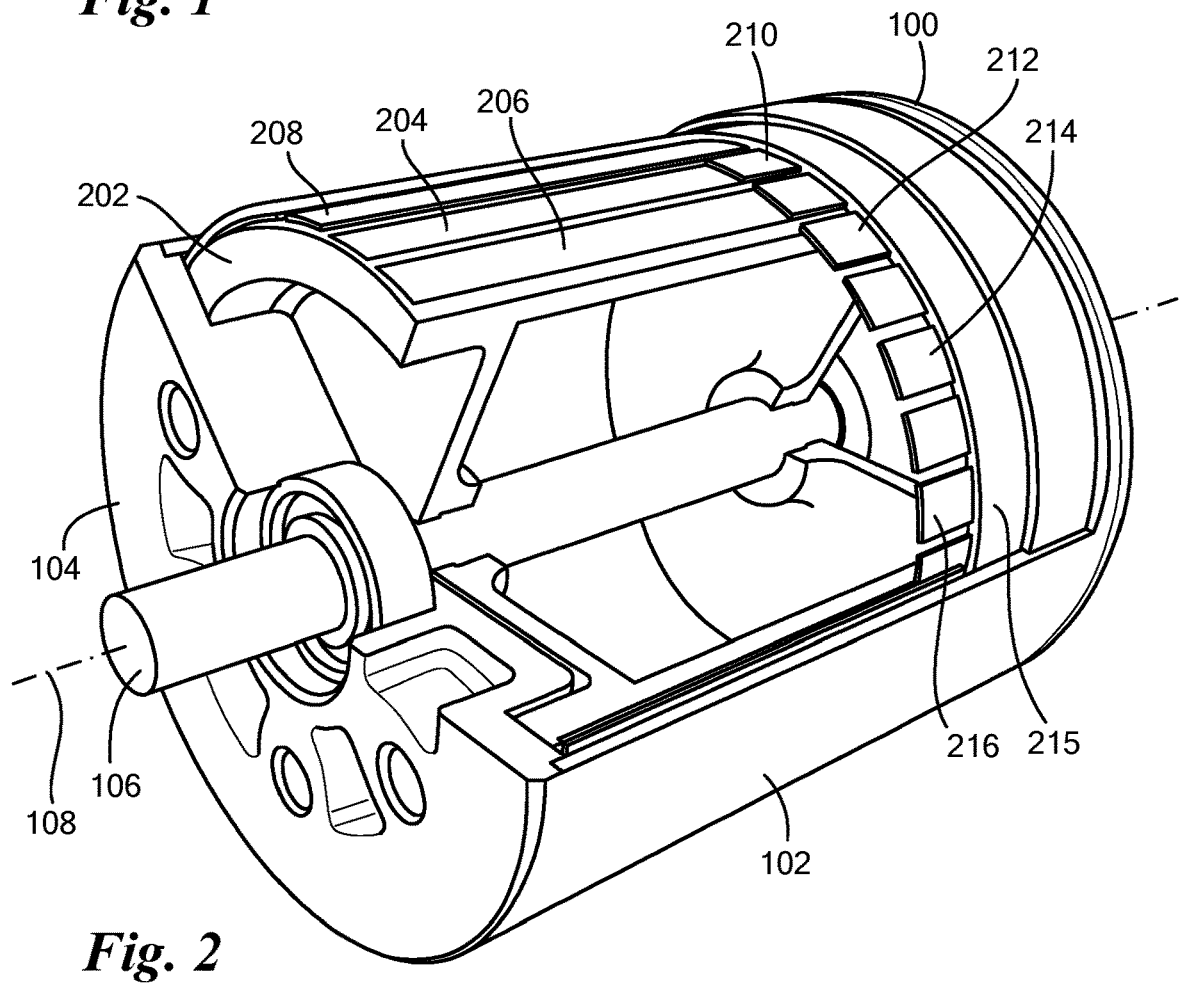
FIG. 2 is a perspective cut-away diagram, of an assembled electrostatic motor, according to an embodiment of the present invention.

FIG. 1 is an isometric diagram, and FIG. 2 is a perspective cut-away diagram, of an assembled electrostatic motor 100, according to an embodiment of the present invention. FIG. 1 shows a case 102, front end cap 104 of the case 102, shaft 106 and axis 108. FIG. 2 shows a cylindrical rotor 202 with a plurality of alternatingly charged electrets, represented by electrets 204 and 206, disposed on an outside surface of the rotor 202. The rotor 202 rotates about the axis 108. A plurality of electrodes, represented by electrodes 208, 210, 212 and 214, is disposed on an inside cylindrical surface of a dielectric substrate 215 to form a stator 216. Ones of the electrets 204-206 of the rotor 202 register with, counterface, are coaxial with, and spaced apart from, the electrodes 208-214 of the stator 216 to define a cylindrical shell between the electrets 204-206 and the electrodes 208-214, although the number of electrets 204-206 need not equal the number of electrodes 208-214. In some embodiments, the cylindrical shell may be on the order of 100s of μm thick. In other embodiments, the cylindrical shell may be thicker or thinner than 100s of μm thick. A dielectric fluid (not shown in FIG. 2), or a partial vacuum, fills the cylindrical shell.

Force generated by any electric motor is defined by the well-known Lorentz force equation (1):

$$F = qv \times B + qE \quad (1)$$

In magnetic motors, the value of the term qv depends on an electric current in a coil of wire, and the value of the term B depends on the strength of a magnetic field from a permanent magnet or an electromagnet. In an electrostatic motor, the value of the term qE depends on the strengths of a static charge (q) and an electric field (E).

Figure 3:
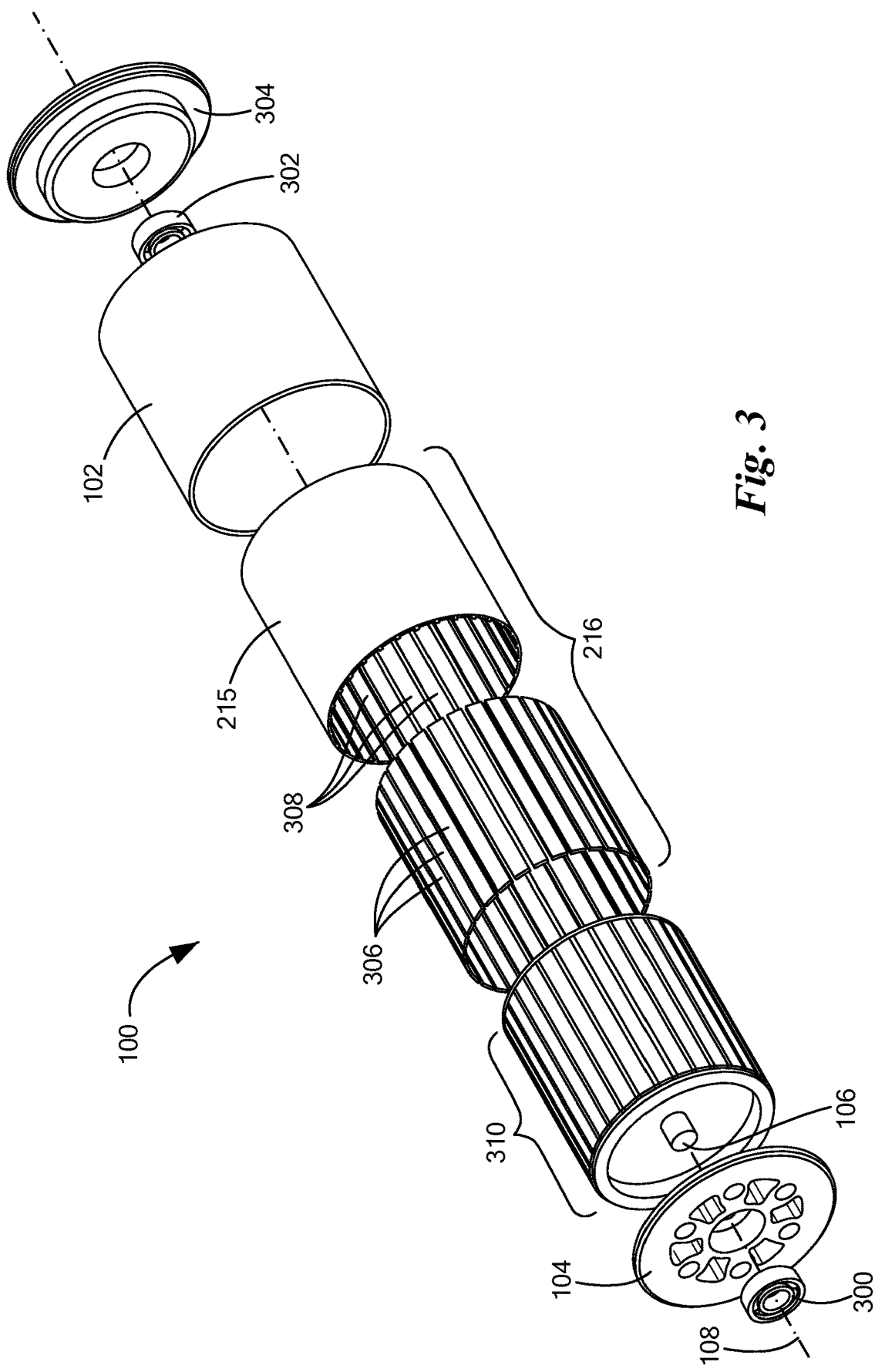
FIG. 3 is an exploded isometric view of the electrostatic motor of FIGS. 1-2.

FIG. 3 is an exploded isometric view of the electrostatic motor 100. FIG. 3 shows the case 102, front end cap 104 and shaft 106, front and rear bearings 300 and 302, respectively, rear end cap 304, the dielectric substrate 215 on which are formed or disposed drive electrodes 306 (corresponding to electrodes 210-224 in FIG. 2), such as in slots 308, and a rotor assembly 310. Collectively, the dielectric substrate 215 and the electrodes 306 form the stator 216.

FIG. 4 is an exploded isometric view of the rotor assembly 310, including the shaft 106, an electret cylinder 400, which includes alternatingly polarized electrets 402 (or alternatively electrically conductive bands, or alternatively both electrets and electrically conductive bands), and front and rear end caps 404 and 406, respectively.

FIG. 5 is an end view, and FIG. 6 is a cross-sectional view, of the electrostatic motor 100. FIG. 7 is an enlarged view of a portion of FIG. 6, as indicated by an arrow 600. Much of the motor 100 can be empty, as indicated at 602, thereby reducing its weight, compared to conventional electromagnetic motors. A cylindrical shell 700 is defined between the electrets 402 and the drive electrodes 306.

Figure 8:
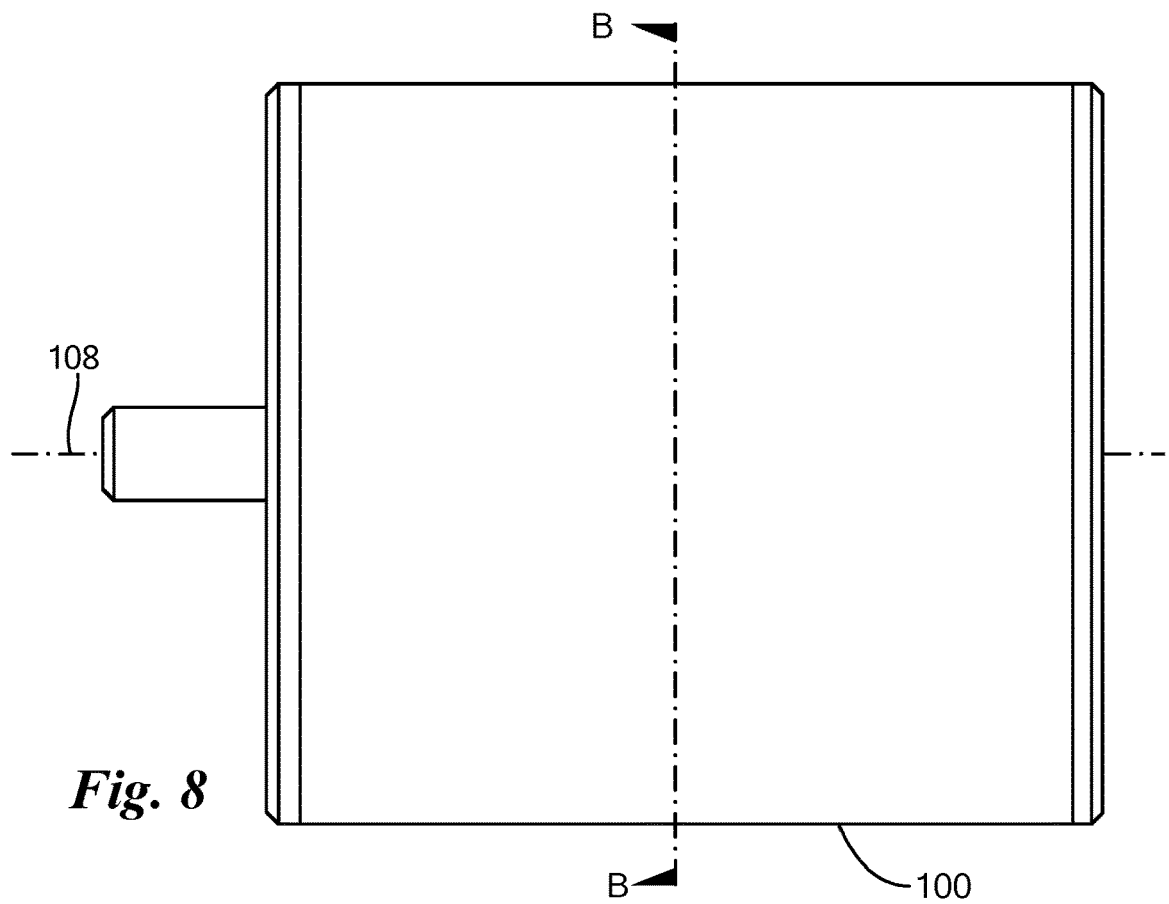
FIG. 8 is a side view.
Figure 9:
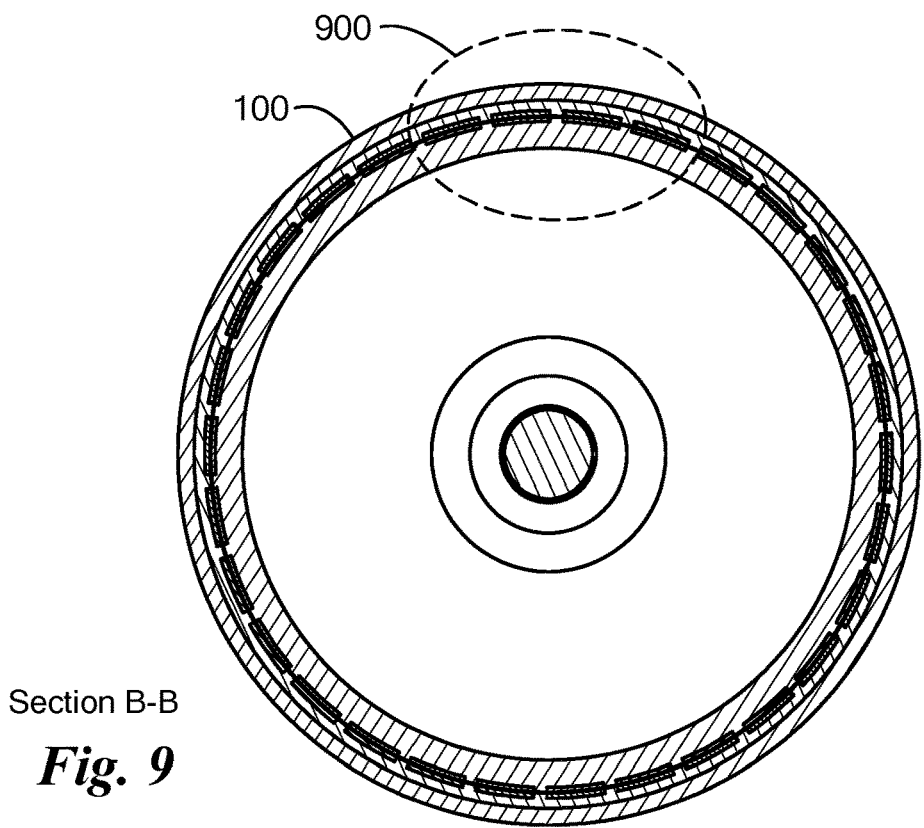
FIG. 9 is a cross-sectional view of the electrostatic motor of FIGS. 1-3.
Figure 10:
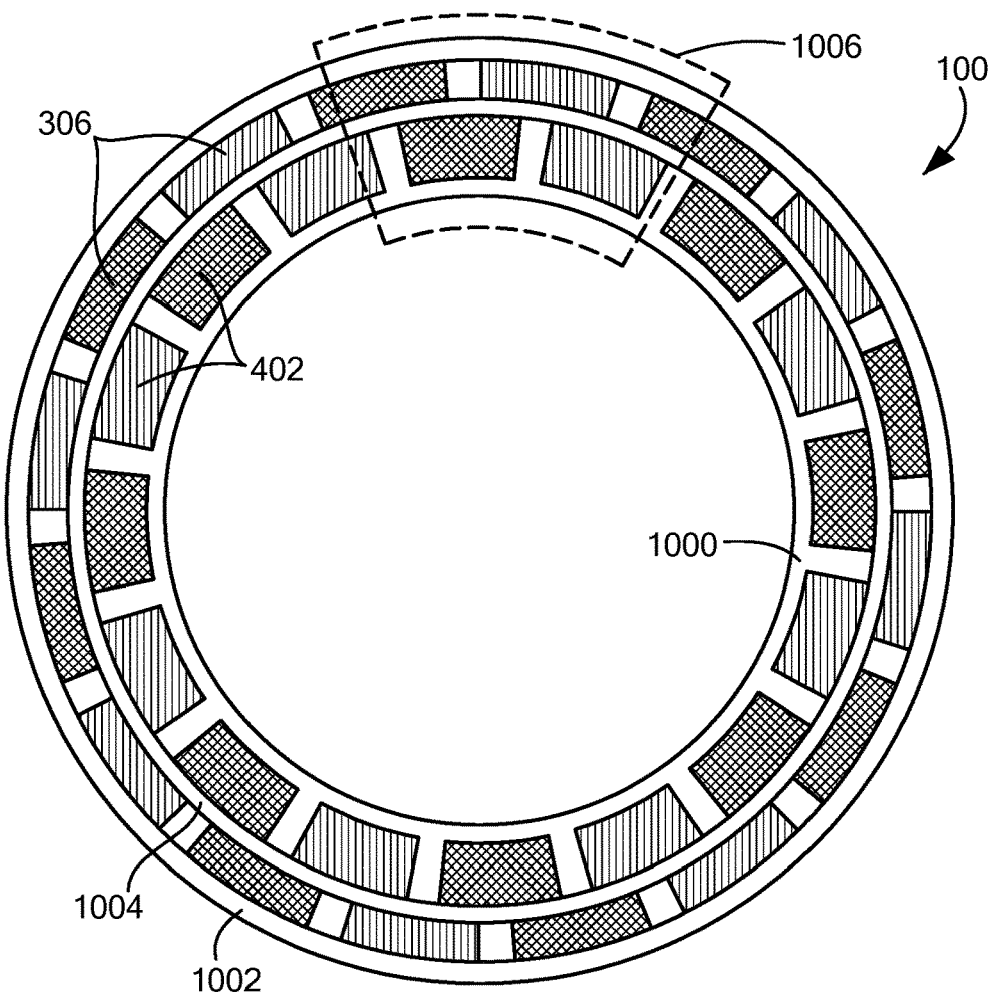
FIG. 10 is a cross-sectional view of the electrostatic motor of FIGS. 1-3, similar to FIG. 9, but with additional detail.
Figure 11:
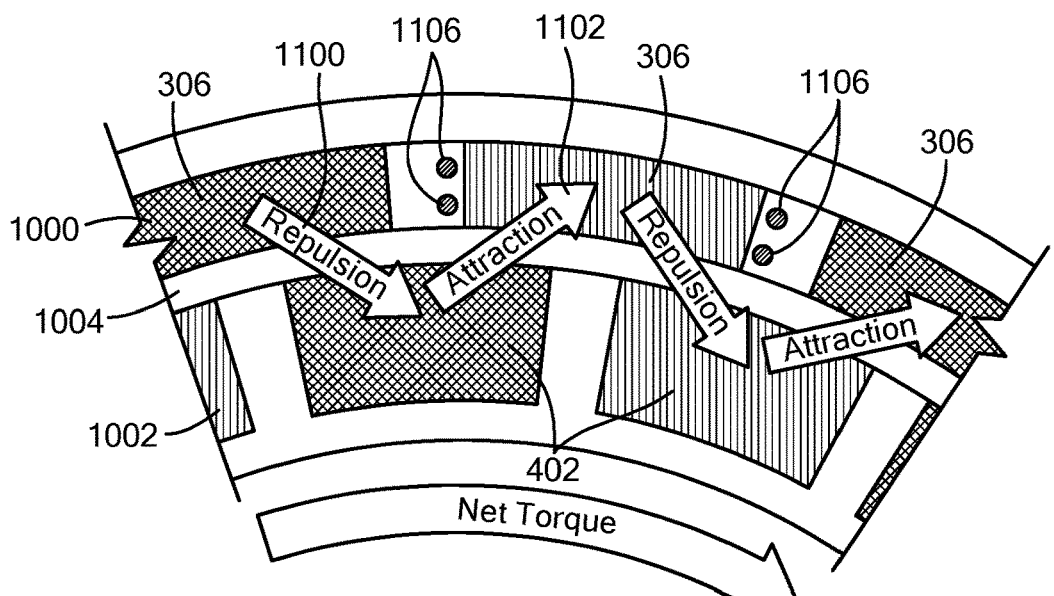
FIG. 11 is an enlarged view of a portion of FIG. 10, showing forces generated within the motor.

FIG. 8 is a side view, and FIG. 9 is a cross-sectional view, of the electrostatic motor 100. A portion 900 of FIG. 9 is shown enlarged in FIGS. 12 and 13. FIG. 10 is a cross-sectional view of the electrostatic motor 100, similar to FIG. 9, but with additional detail. FIG. 10 illustrates a rotor 1000 and a stator 1002 with a dielectric fluid 1004 therebetween. FIG. 11 is an enlarged view of a portion 1006 of FIG. 10, showing forces, exemplified by repulsion and attraction forces 1100 and 1102, respectively, generated within the motor 100. Dimensions of the electrets and electrodes are exaggerated for clarity.

Figure 12:
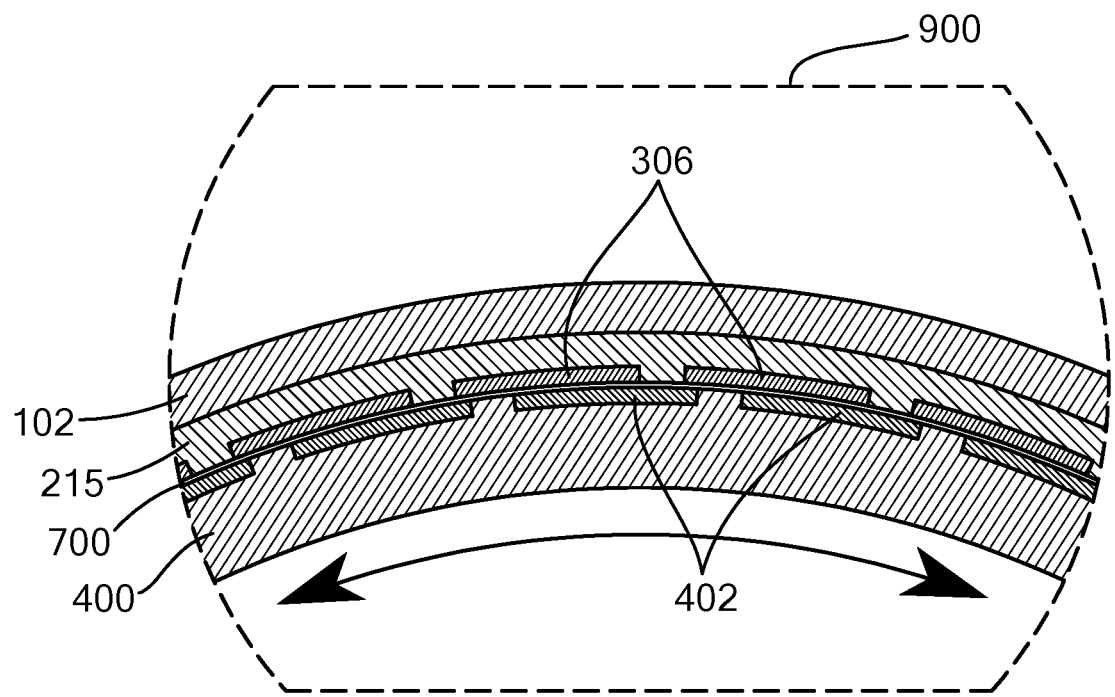
FIG. 12 is an enlarged view of a portion of FIG. 9 showing motor components.
Figure 13:
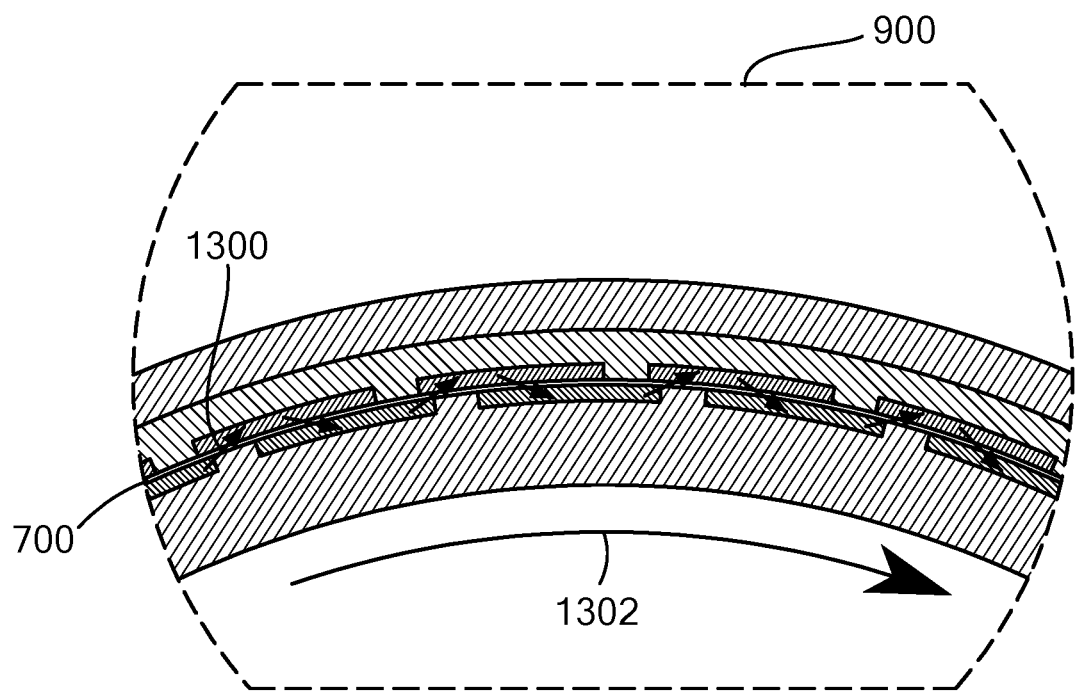
FIG. 13 is the enlarged view of the portion of FIG. 9 showing forces and resulting rotation of the rotor.

FIG. 12 is an enlarged view of a portion of FIG. 9 showing motor components, and FIG. 13 is the enlarged view of the portion of FIG. 9 showing forces and resulting rotation of the rotor assembly 310. In FIG. 13, attractive and repelling forces between drive electrodes and electrets (or rotor electrodes) are indicated at 1300 and a direction of net rotation of the motor 100, caused by torque resulting from the forces 1300, is indicated by an arrow 1302.

Rotor with Electrodes Embedded in Bulk Electret Material to Facilitate Charging

Figure 14:
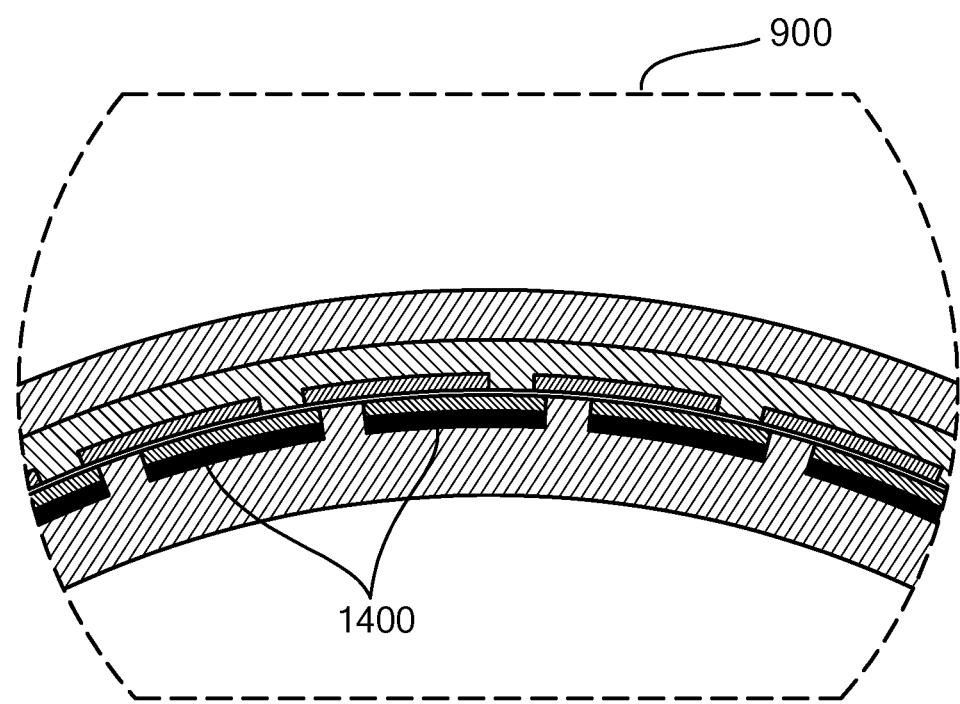
FIG. 14 is an enlarged view of a portion of FIG. 9 showing regions of conductive material within the rotor that form embedded charging electrodes, according to an embodiment of the present invention.

In some embodiments, the rotor includes electrically conductive material embedded in the bulk electret material to form embedded charging electrodes. These electrodes facilitate contact charging, without need for external charging fixtures, thus simplifying the process for manufacturing an electret rotor. Furthermore, the rotor surface can be submerged in dielectric fluid during charging, which prevents air breakdown near the rotor surface or accumulation of charged particles on the rotor, providing further advantages. FIG. 14 is an enlarged view of a portion 900 of FIG. 9, which shows a cross-section through the motor, showing regions of conductive material within the rotor that form embedded charging electrodes 1400. Optionally, additional regions of electrically conductive material (not shown) may be disposed on the outer surface of the rotor, radially registered with, but radially spaced apart from, the embedded charging electrodes 1400. Embodiments with both outer and embedded charging electrodes provide choices for charging the electrets. Charging the electrets can be performed by applying a voltage across circumferentially adjacent charging electrodes on the outside of a rotor, across circumferentially adjacent charging electrodes on the inside of a rotor and across radially adjacent charging electrodes, i.e., one charging electrode on the outside of the rotor and one charging electrode on the inside of the rotor. Charging the electrets according to these choices yields different charge patterns and charge densities.

To embed electrodes within a bulk electret material, a layer of conductive material may be deposited on the surface of a cylinder of electret material using known methods, such as sputtering or chemical vapor deposition (CVD). The conductive material is patterned, such as through shadow masking, to form discrete electrodes. Next, a layer of electret material is deposited on top of the electrodes deposited in the previous step, burying most of the conductive material. The electret material may be deposited by over-molding, chemical vapor deposition or any other suitable method. The final layer of electret material is prevented from covering a small region of each embedded electrode, such as by masking or other suitable method, such that portions of the embedded electrodes remain physically accessible for connection to a voltage source.

The electret material is then polarized by connecting adjacent, embedded electrodes to positive and negative poles of a voltage source, respectively, which thereby creates an electric field within the electret material between the adjacent embedded electrodes, causing that portion of material to become polarized.

In some embodiments, charging electrodes 1400 of every other electret are electrically connected together within the rotor, forming two circuits, one circuit for electrets that are to be positively charged, and the other circuit for electrets that are to be negatively charged. Nevertheless, each electret is considered to have a respective charging electrode 1400.

In the embodiment shown in FIGS. 1-13, electrets are disposed on the surface of the rotor assembly 310, and electrodes 306 (208-214) are disposed on the inside surface of the stator 216. However, in some other embodiments, the electrets are disposed on the inside surface of the stator 216, instead of or in addition to the electrodes 306 (208-214), and other electrodes are disposed on the surface of the rotor assembly 310. In these embodiments, electrical signals are sent to the rotor assembly 310, rather than the stator 216, such as via brushes or slip rings, to commutate the motor 100.

In the embodiment shown in FIGS. 1-13, the rotor assembly 310 is disposed within the stator 216, and the rotor assembly 310 is a cylinder with an outside surface that counterfaces an inside cylindrical surface of the stator 216. The rotor assembly 310 spins within the stator 216. However, in some other embodiments, the rotor assembly 310 spins outside the stator 216. In these other embodiments, the stator is configured as a cylinder with electrodes and/or electrets on its outside surface, and the rotor defines an inside cylindrical surface that counterfaces the stator.

In general, electrostatic motors generate torque by electrostatic attraction or repulsion between charged surfaces. Motors, according to embodiments of the present invention, include a cylindrical rotor 202 (FIG. 2) with an outer surface made of a plurality of polarized electret materials and/or conductive electrodes, represented by electrets 204-206. The motors also include a case 102 with a cylindrical arrangement of conductive electrodes, represented by electrodes 208-214 that surround the rotor 202. The electrodes 208-214 collectively form a stator 216. A thin cylindrical shell of dielectric fluid (not shown in FIG. 2), but shown at 1004 in FIGS. 10 and 11, is situated between the outer surface of the rotor 202 and the stator 216. In some embodiments, as little as a few milliliters of dielectric fluid fill the space between the outer surface of the rotor 202 and the stator 216.

Some embodiments use electret rotors. In these embodiments, electrets 204-206 (402) and drive electrodes 208-214 (306) are arranged such that by applying positive and negative voltages to the drive electrodes 306, electrically charged regions 402 on the rotor 102 are electrostatically attracted to, or repelled from, nearby electrodes 306, causing a net torque to be applied to the rotor, causing it to rotate, as schematically illustrated in FIG. 11. The electrodes 208-214 (306) are manufactured onto a substrate material, such as alumina, with a high dielectric constant to prevent discharges (arcing) between the electrodes. By varying the polarities of voltages on the drive electrodes 208-214 (306) over time, a sustained clockwise or counterclockwise torque is applied to the rotor 1002, causing continuous rotation of the shaft. The magnitude of the torque depends on the intensities of the electric fields that the electrodes 208-214 (306) apply to the rotor 1002, charge on the electrets 204-206 (402), number of counterfacing electrode/electret pairs (although there need not necessarily be equal numbers of electrets on the rotor as electrodes on the stator) and radius at which the electrets are disposed from the center of the shaft. Optionally, each electrode 208-214 (306) is surrounded by an electrically, floating-potential conductive guard ring or field plate, exemplified by ring 1106, to shape the electric field of the electrode 306, as is known in the art.

The angle subtended by each electrode (equivalently, the circumferential width of each electrode) can be made very small, on the order of 1 Thus, the stator may have a very large number of drive electrodes. The number of drive electrodes can thus greatly exceed the number of polarized regions of electret material, thus a very large number of phases may be independently activated to reduce torque ripple and improve motor efficiency.

An external power supply (not shown) applies voltages to the drive electrodes, and a switching circuit (not shown) modulates the voltages, i.e., commutates the motor, depending on the real-time angular position of the rotor, such that a net torque is consistently applied in a desired orientation. The power supply and switching circuit energize the electrodes to commutate the motor in a manner analogous to a conventional brushless direct current motor. The angular position of the rotor may be sensed using an electrostatic method described herein, or by conventional angular position sensors, such as optical encoders, Hall effect sensors or the like. The switching circuit may include semiconductor devices, such as field-effect transistors, bipolar transistors, commutator brushes and other related components capable of switching high voltages, as is well known in the art.

In an alternate embodiment, the electrets are either replaced or supplemented with conductive electrodes ("rotor electrodes"), and the rotor electrodes are charged by an external voltage source.

Dielectric Fluid Between Rotor and Stator

In general, large electric fields are not stable, because air becomes conductive, i.e., ionizes (breaks down), in an electric field exceeding approximately 3 MV/m. The dielectric fluid 1004 (FIG. 10) in some motor embodiments enables very high electric fields to be applied to the rotor from the electrodes without breakdown, enabling much higher torque than would be possible with an air gap between the electrodes and the electrets/rotor electrodes. A low viscosity dielectric fluid is preferred, such as an alkane hydrocarbon fluid or fluorocarbon fluid, since low viscosity enables high shaft rotation speeds with low fluid frictional losses. However, a high viscosity dielectric fluid may be suitable where relatively low shaft speed is acceptable, such as in a robot arm.

Suitable dielectric fluids may include alkanes, perfluorocarbons, purified water, silicone oil, mineral oil and other chemicals known in the art. Suitable nanoparticles may be added to the dielectric fluid to increase electrical breakdown strength.

In an alternate embodiment, the dielectric fluid is a high partial vacuum established within the motor case, such as by a vacuum pump. A vacuum-compatible rotary seal, such as a ferrofluidic seal or end-face mechanical seal, as known in the art, enables the rotating motor shaft to penetrate the case without loss of vacuum. A high partial vacuum can replace the dielectric fluid because it has a very high electric field breakdown strength. In some embodiments, the partial vacuum has a pressure below about 1 mTorr (0.13 Pa). Specific vacuum requirements depend on electrode (or electret) spacing and drive voltage and may be calculated by reference to Paschen's law. Such a partial vacuum provides an efficiency advantage because fluid friction energy losses that would result from dielectric fluid are eliminated.

In a related embodiment, a dielectric fluid is installed in the cylindrical shell between the rotor and case, but air in the remainder of the empty space within the case is replaced by a partial vacuum or an inert gas, such as nitrogen. Replacement of the air is advantageous for maintaining purity of the dielectric fluid, which may otherwise become contaminated by atmospheric gases within the air.

Multiple Concentric Cylindrical Arrangement

Figure 26:
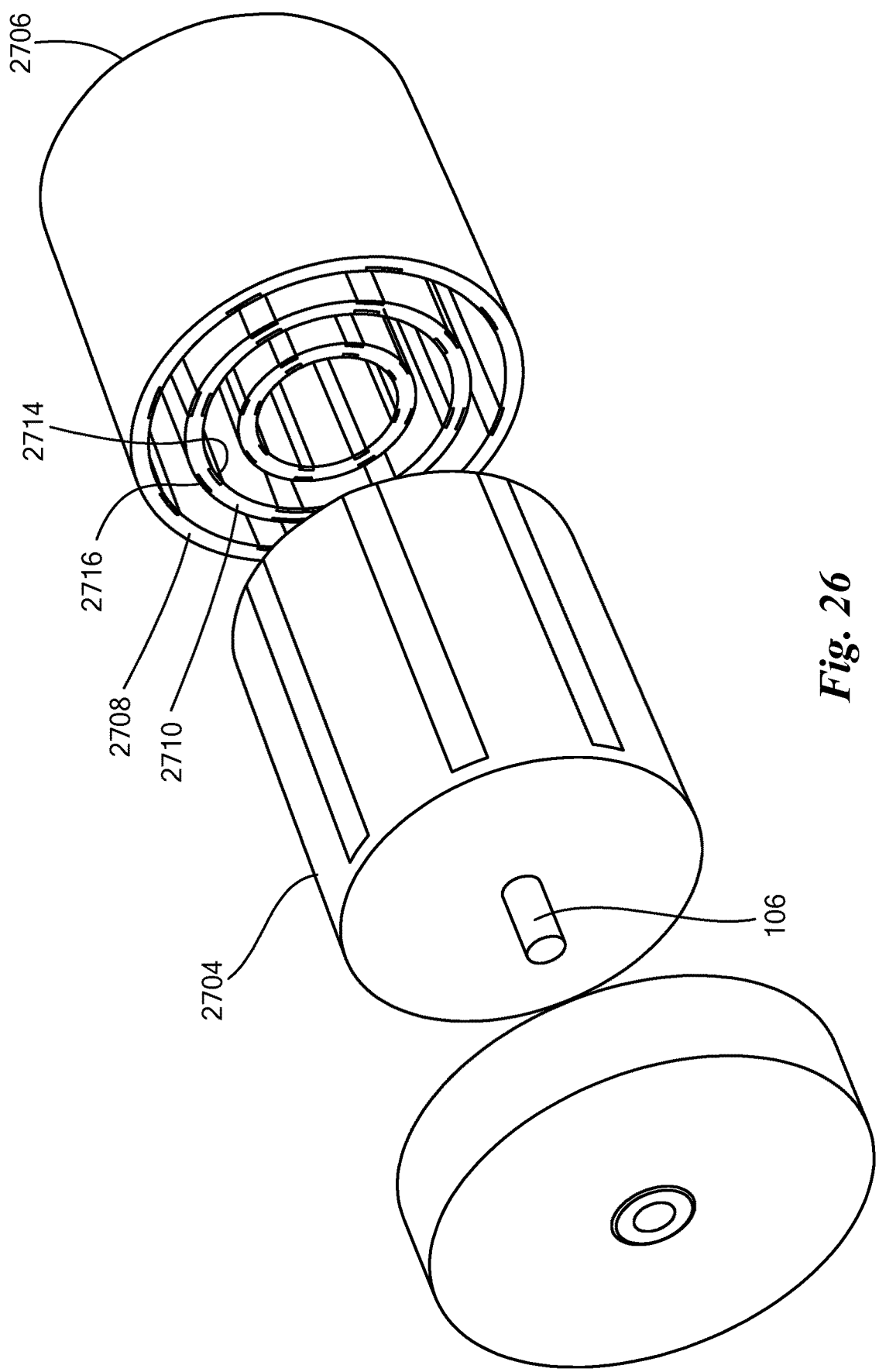
FIGS. 26, 27 and 28 are respective exploded, cut-away exploded and cut-away assembled perspective view diagrams of an electrostatic motor that includes multiple concentric cylindrical rotors and stators, according to an alternate embodiment of the present invention.
Figure 27:
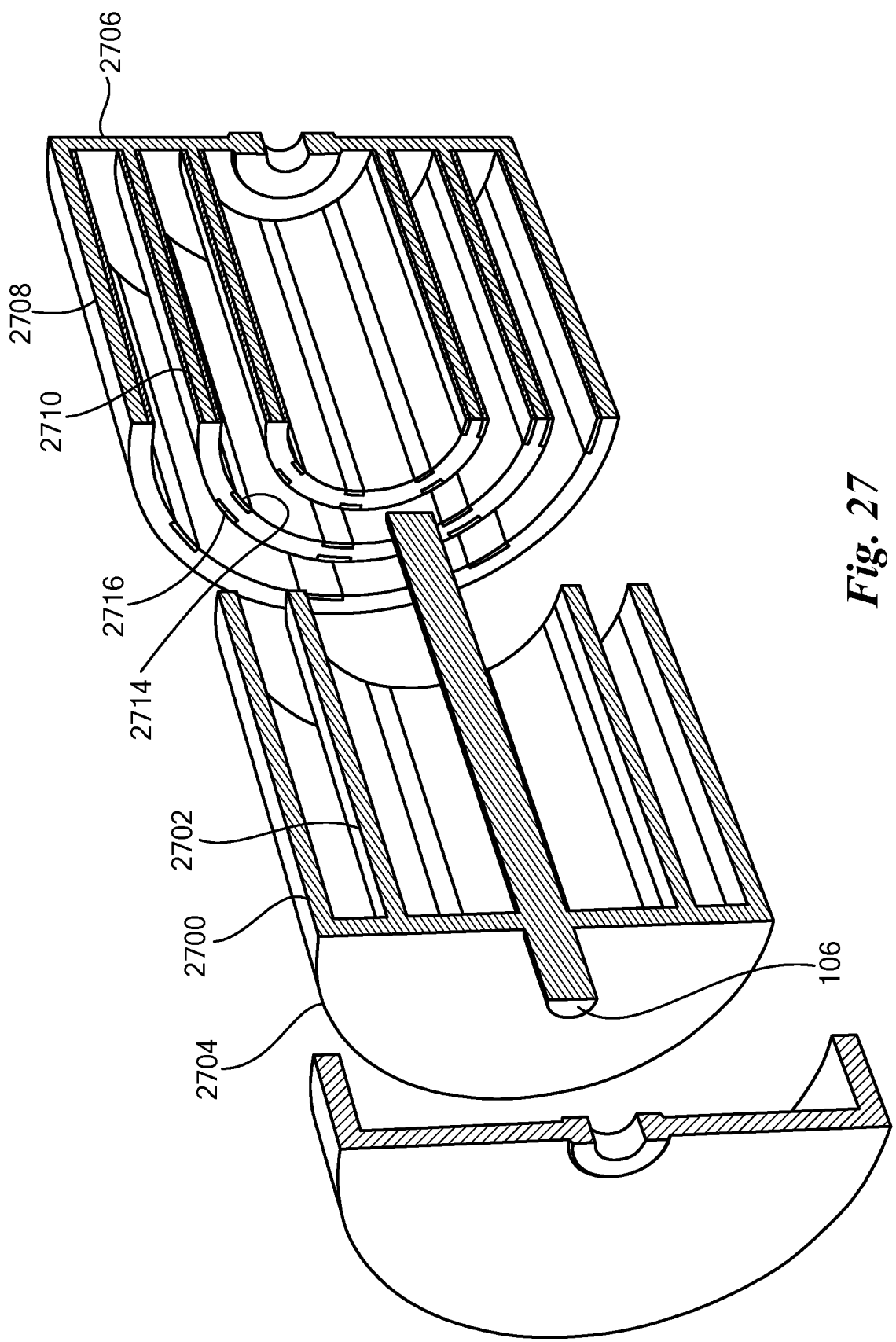
Figure 28:
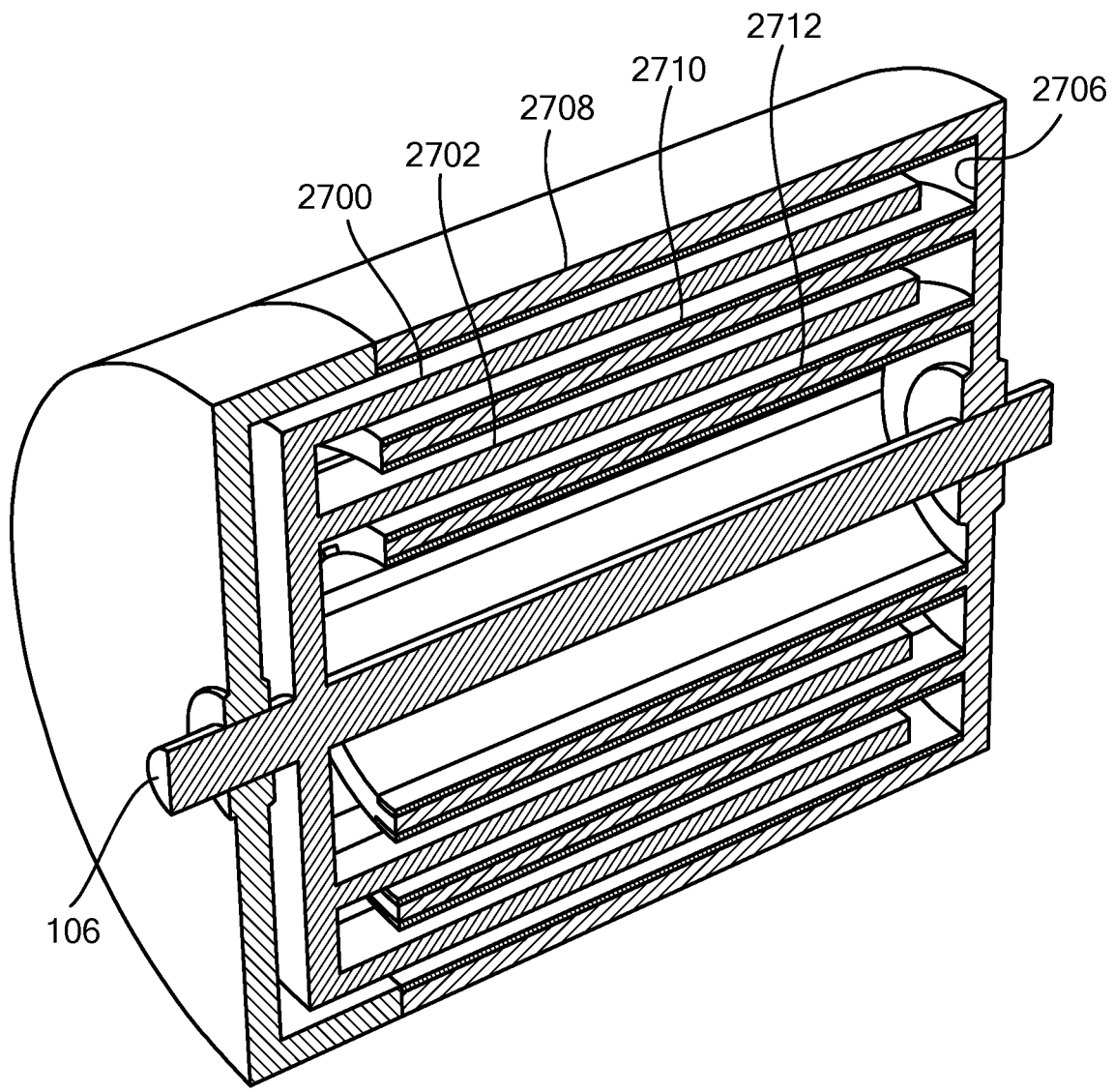

In another alternate embodiment, multiple concentric cylindrical arrangements, exemplified by cylinders 2700 and 2702, of polarized electret material are attached to one or more discs, such as disc 2704, that are attached to the shaft 106, as shown in FIGS. 26-28. One or more other discs, exemplified by disc 2706, are attached to the case and support electrodes that are disposed in multiple concentric cylindrical arrangements, exemplified by cylinders 2708, 2710 and 2712. The electrodes extend from these discs 2708-2712 to apply electric fields to the multiple electret cylinders 2700-2702. It should be noted that electrodes and electrets may be disposed on one or both surfaces of each cylinder 2708-2712 and 2700-2702, for example as shown at 2714 and 2716. This configuration provides more torque than with a single electret cylinder and is suited to applications where a large diameter is available for a motor, but length of the motor is limited. The disadvantage of this approach is that the weight of the motor is increased.

Figure 15:
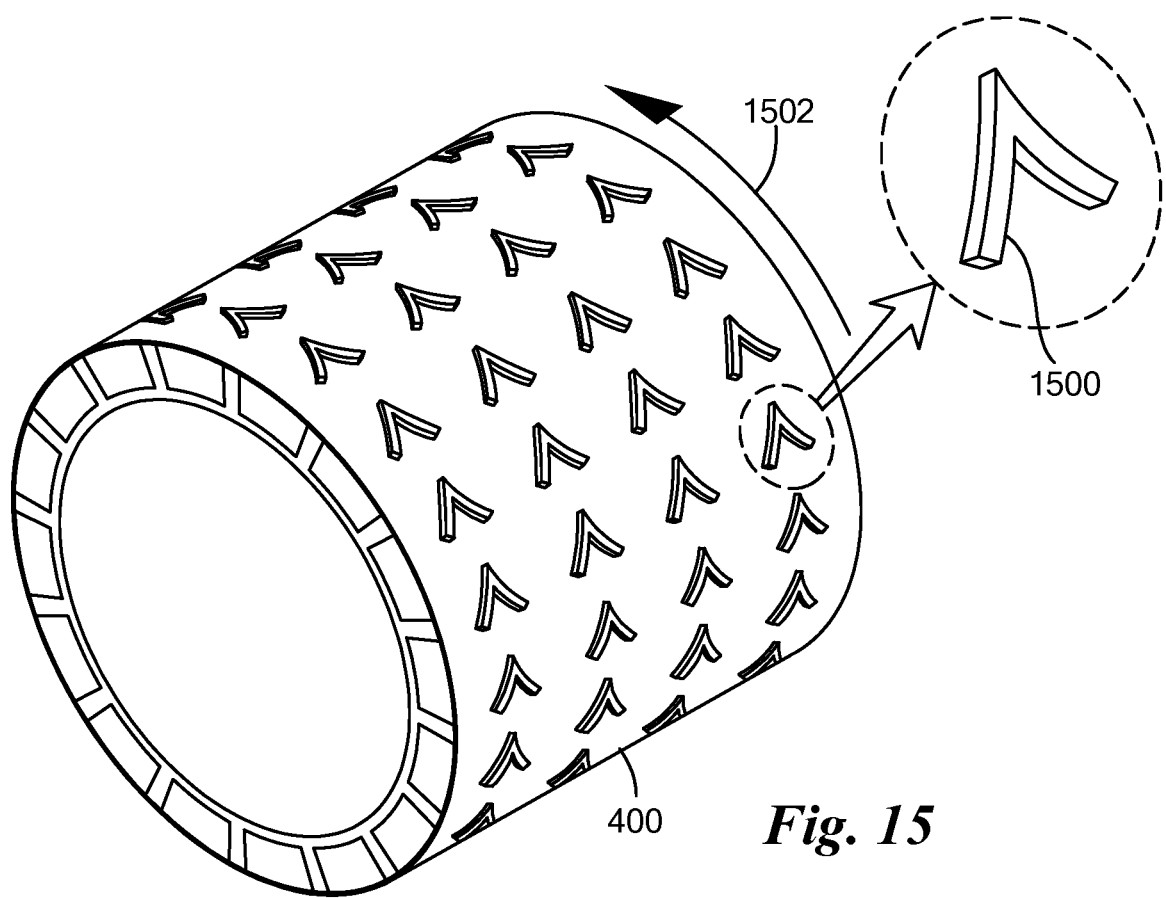
FIG. 15 is an isometric view.
Figure 16:
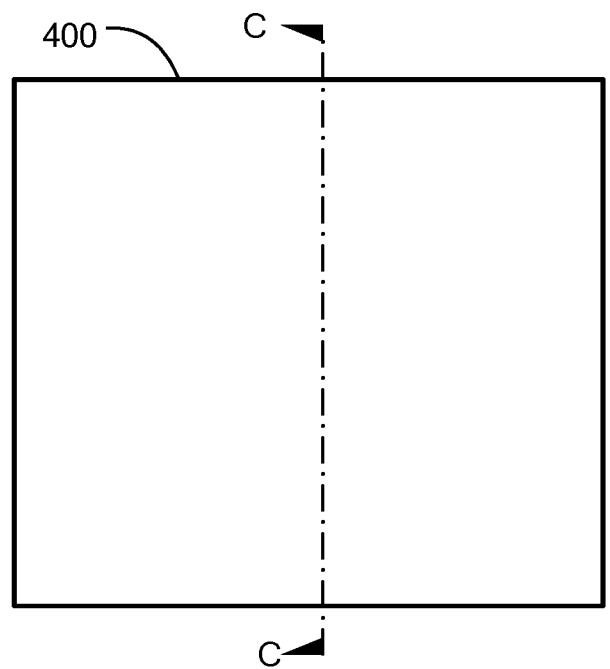
FIG. 16 is a side view.
Figure 18:
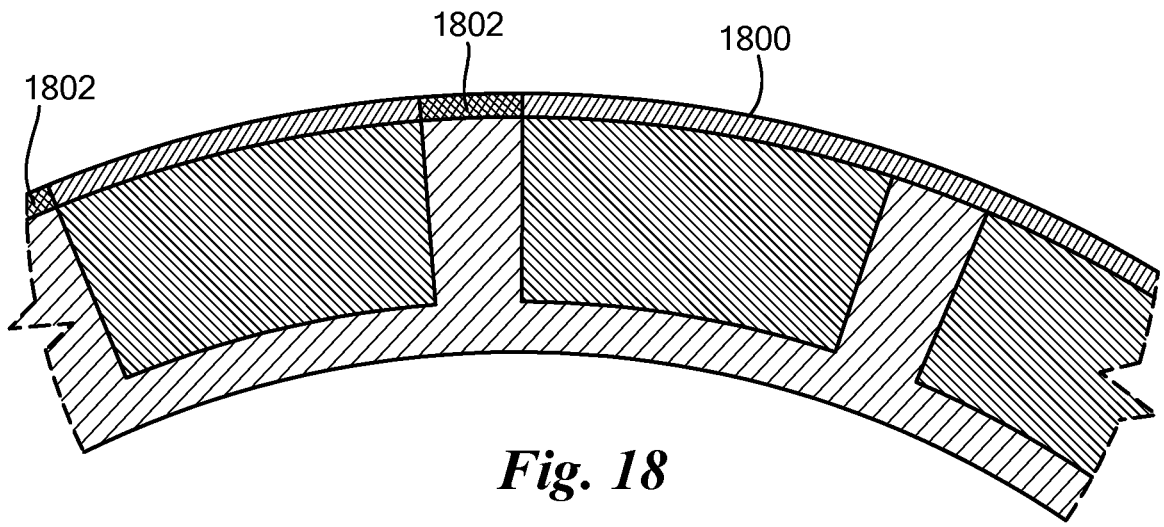
FIG. 17 is a cross-sectional view and FIG. 18 is an enlarged view of a portion of the rotor with an optional coating of an electrically conductive material, according to an embodiment of the present invention.
Figure 17:
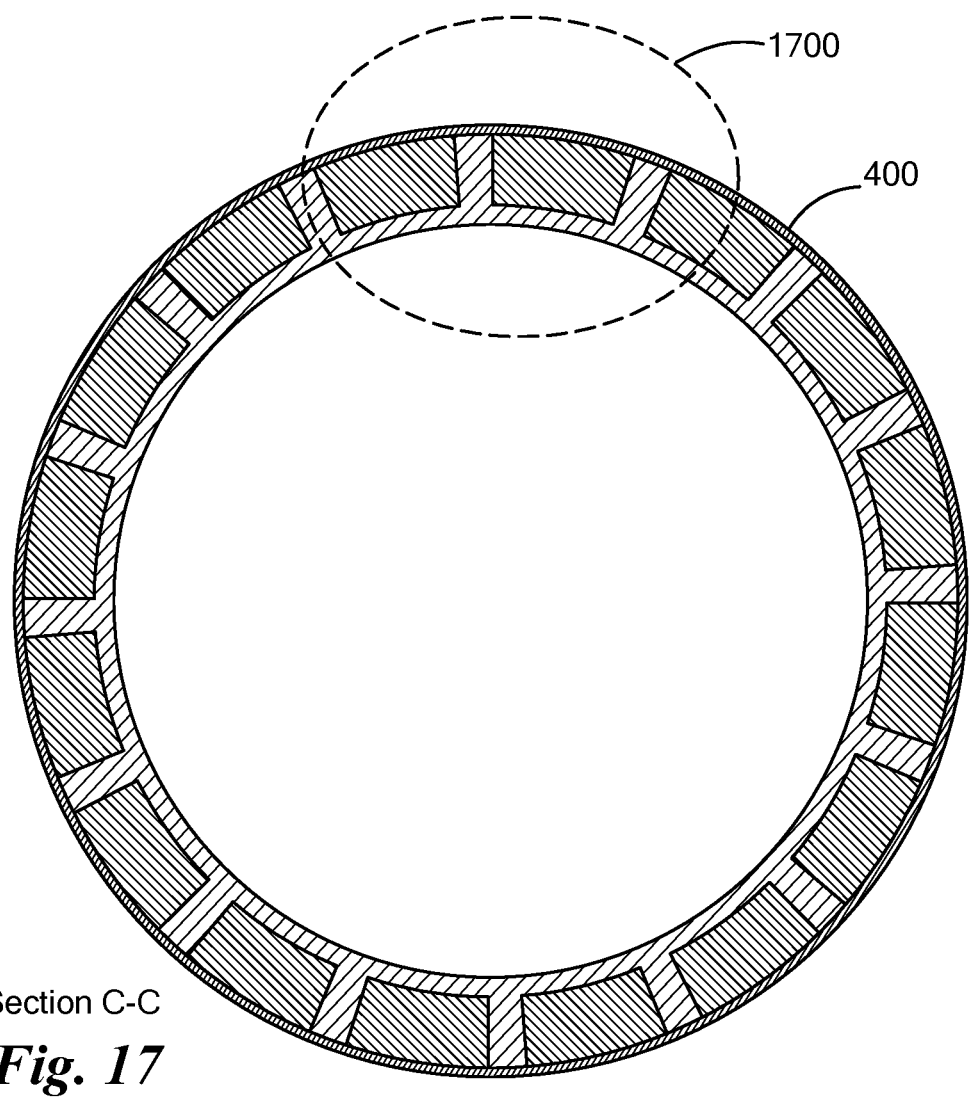

FIG. 15 is an isometric view, FIG. 16 is a side view, and FIG. 17 is a cross-sectional view of the electret cylinder 400 of the rotor assembly 310. FIG. 18 is an enlarged view of a portion 1700 of the electret cylinder 400. As shown in FIG. 18, in another embodiment, the electret rotor is coated in a thin layer of electrically conductive material 1800, which concentrates electret charge near the surface of the rotor and also concentrates the electric field emanating from electrode pairs at the surface of the rotor. By concentrating both the electric field from the electrodes and the charge from the electrets close to the rotor surface, a higher torque can be applied to the rotor than if the conductive coating is absent.

Furthermore, the electrically conductive material 1800 prevents direct physical contact between the dielectric fluid 1004 and the electrets 402. Such contact can cause an accumulation of charge that damages the electrets 402. In some embodiments, the layer of electrically conductive material 1800 is segmented by electrically insulative material, exemplified by electrical insulators 1802. Optionally, the electrically conductive material 1800, or ones of the segments of electrically conductive material, is connected to a voltage supply to recharge depleted electrets.

Dielectric Fluid Filtration

Performance of the dielectric fluid may degrade over time by infiltration of particles, bubbles and/or dissolved atmospheric gases. To exclude these contaminants, a rotary seal may be installed at the end(s) of the case, where the shaft protrudes. Suitable rotary seals include ferrofluidic seals and end-face mechanical seals.

Another method for avoiding performance loss due to particle, bubbles and/or dissolved gases is to enable the dielectric fluid to be replenished from a reservoir of purified dielectric fluid. The dielectric fluid reservoir may be pressurized with an atmosphere of inert gas, such as nitrogen, and routed to the interior of the motor. When it becomes necessary to replace the fluid, a mechanical or electronically actuated valve may be opened to drain the contaminated dielectric fluid, and to allow the fluid stored in the reservoir to displace the contaminated fluid. The reservoir is preferably a detachable cartridge, which can be replaced as necessary to maintain optimal dielectric fluid quality.

In another embodiment, a large pressure is externally applied to the dielectric fluid. When pressurized, the dielectric fluid can support a larger electric field without breakdown than when no pressure is applied. This beneficial effect increases approximately linearly with increased pressure above atmospheric pressure. The pressure may be generated mechanically, such as with a compressed spring that applies force to a piston situated in fluid communication with the dielectric fluid, or with a pressurized, inert gas, such as nitrogen, that applies pressure to a surface of the dielectric fluid. An additional benefit of this configuration is that the pressurized fluid acts as a hydrostatic bearing, which helps stabilize and lower friction on the rotor, and maintain a very small gap between the rotor and the stator. One advantage of the small gap between the rotor and the stator is that the motor can produce a large torque, relative to other configurations that would require a larger gap. Another advantage of the small gap is that the motor can be operated with lower voltages than would be required if the gap were larger. In a related embodiment, the surface of the rotor is patterned with three-dimensional features, such as chevron shapes exemplified by chevron 1500 in FIG. 15, that locally increase the pressure of the dielectric fluid when the rotor is in motion, as indicated by an arrow 1502, boosting the fluid's breakdown strength.

Accumulation of charged particles on the surfaces of electrets may cancel the electret charges and degrade performance of the motor. Some embodiments include a charging and cleaning mode, in which a sufficiently large voltage is applied between each adjacent pair of electrodes. The large voltage creates a strong electric field gradient, which displaces entrapped particles from the surfaces of the electrets while also polarizing the electrets to a desired level of charge.

Some embodiments include components to continuously, periodically or occasionally clean the contaminated dielectric fluid of particles, bubbles and/or dissolved gases. In some such embodiments, impellers extending from the rotor cause the dielectric fluid to be pumped through a filter, such as a porous membrane or an electrostatic or magnetic filter.

An advantage of an electrostatic filter is that the motor's electric power supply may be sufficient to power the electrostatic filter. In both of the above embodiments, the impellers, which form an internal pump, may be replaced by a conventional, secondary pump, such as a peristaltic pump, scroll pump or other suitable fluid pump.

Real-Time Angular Measurement of Rotor/Shaft

Some embodiments detect real-time angular position of the rotor assembly 310, without a need for additional sensors, such as optical encoders, magnetic sensors, resolvers or the like. It is useful to detect the rotor position, for accurate rotor positioning and speed control, and doing so without additional sensors simplifies the motor and reduces its cost, size and weights. In these embodiments, to measure the shaft 106 angle, the rotor is extended such that a small portion of each charged electret band, or rotor electrode, extends past the ends of the drive electrodes. A secondary arrangement of two or more sensing electrodes is attached to the interior of the case, near the extended portion of the rotor, and is electrically isolated from the electrodes that are used to apply torque to the rotor. As the rotor spins, the motion of the electrets causes electrical charges to be induced on the sensing electrodes. The physics of electrostatic induction causes the magnitudes of these charges to vary in relation to the angle of the shaft, and the charges can be measured using standard voltage measurement circuits, as are known in the art. The angular position of the shaft can be inferred by the magnitude of these measured voltages.

Geometry of Cylindrical Electrostatic Motor

Embodiments of the present invention include a particular geometric arrangement of electrets 402, or rotor electrodes, and drive electrodes 306 that is distinct from previous motors. In particular, disposing the electrets 402 and/or electrodes on a cylindrical surface, rather than on a surface of a disk or on pegs, provides advantages. For example, all the electrets 402 and/or electrodes are disposed a radial distance (for example, the radius of the rotor's electret cylinder 400) from the shaft 106. Therefore, electrostatic forces 1300 acting on these electrets 402 and/or electrodes act through a moment arm equal to the radius to apply torque to the shaft 106. In disc-based electrostatic motors, charges acting on portions of the disc close to the shaft apply far less torque than charges acting on portions of the disc close to the circumference of the disc. Furthermore, electret rotor embodiments combine two elements that have not previously been combined in a rotary motor: (1) electrets 402 and (2) dielectric fluid 1004.

Both surfaces in contact with the dielectric fluid 1004, i.e., the surface of the rotor 1000 and the surface of the stator 1002, are smooth, relative to conventional electric motors, thus these smooth surfaces create much less fluid drag than conventional motors, leading to improved efficiency of the electrostatic motor. The volume of dielectric fluid 1004 used to fill the gap 700 between the rotor and stator is very small, relative to other motors (such as the motor described in U.S. Pat. Publ. No. 2016/0344306) that use dielectric fluid, owing to the small distance between the rotor 1000 and the stator 1002. Thus, the fluid weight is also small, the cost of the fluid is low compared to motors that require a larger volume of fluid, and the fluid is easier to dispose of.

The embodiments described herein were arrived at with the aid of advanced computer modeling tools, such as finite element analysis, which were not available to earlier generations of electrostatic motor designers, and required multiple design iterations and experimentation with geometry and material properties. Furthermore, the electret rotor embodiments were inspired in part by our knowledge and experience with state-of-the-art electret materials and manufacturing methods, which were not known to earlier designers, such as Jefimenko and Walker, and also our analysis of state-of-the-art, high-breakdown dielectric fluids.

Several textbooks have "taught away" from pursuing electrostatic motors at scales larger than the micro-scale, arguing that the breakdown strength of air presents a fundamental limitation, discouraging inquiry into the subject.

Methods and Apparatus for Charging Defined Regions on a Cylindrical Electret

Figure 19:
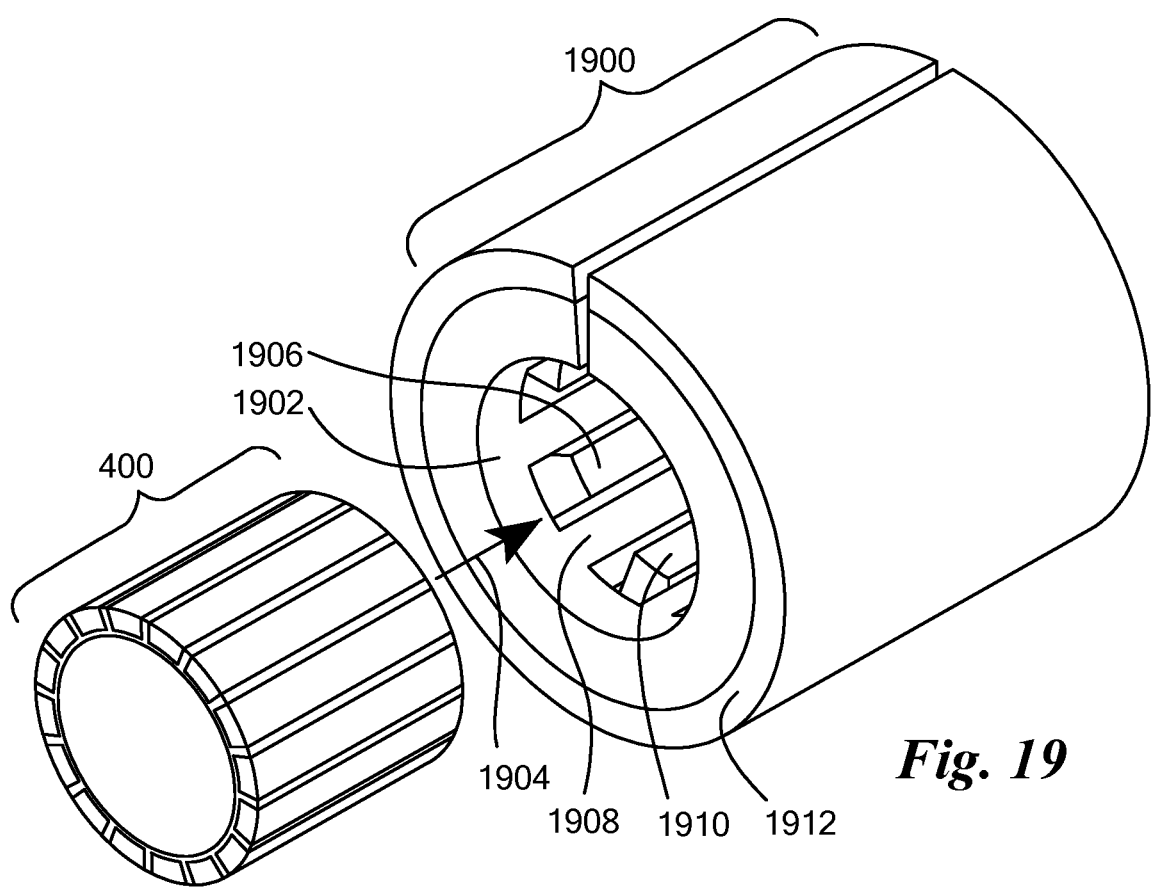
FIG. 19 is an isometric diagram illustrating a contact charging fixture, according to an embodiment of the present invention.

Another aspect of the present invention involves apparatus and methods for contact charging defined regions on a cylindrical electret. Conventional contact charging is a well-known method for polarizing flat electrets. However, conventional contact charging methods are inadequate for charging defined regions on a cylindrical electret. FIG. 19 illustrates a contact charging fixture 1900 that may be used to polarize a cylinder of electret material 400 with multiple, positively charged regions and multiple negatively charged regions. The cylinder of electret material 400 is inserted into a bore 1902 of the contact charging fixture 1900, by advancing the cylinder 400 in a direction shown by an arrow 1904. The contact charging fixture 1900 includes an arrangement of electrically conductive electrodes, exemplified by electrodes 1906, 1908 and 1910, attached to a non-conducting cylinder 1912. The non-conducting cylinder 1912 maintains physical separation between positively charged and negatively charged portions of the conductive electrodes 1906-1910, thus preventing electrical shorting between them.

Figure 20:
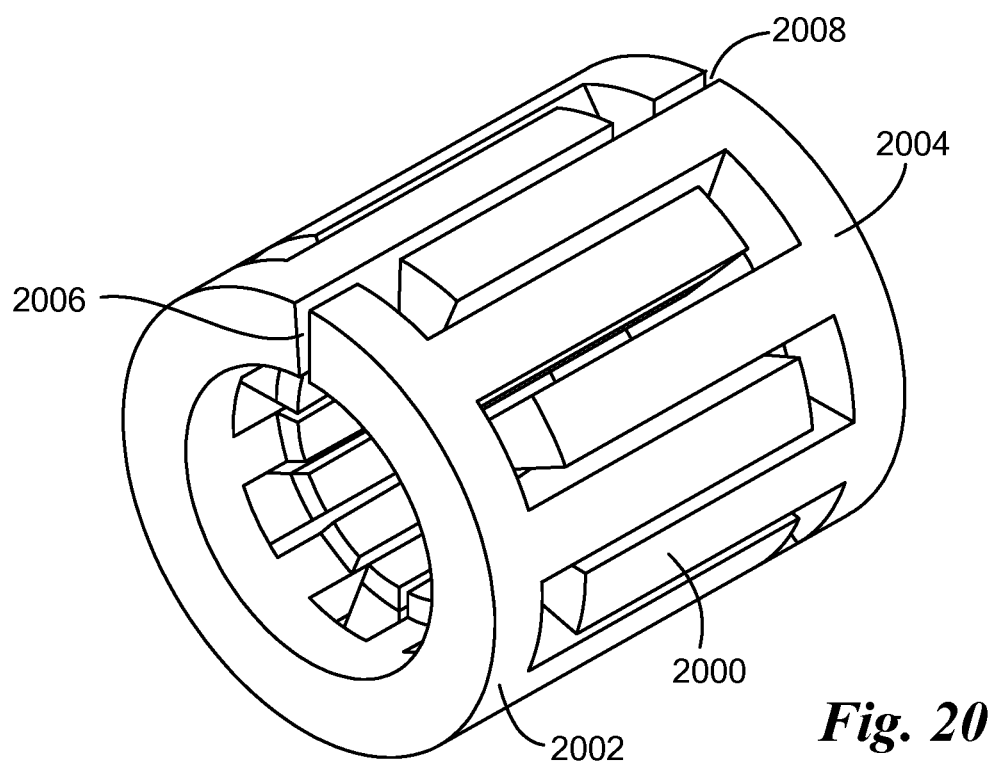
FIG. 20 is an isometric diagram of the contact charging fixture of FIG. 19, with an outer cylinder removed for clarity.

FIG. 20 is a view of the contact charging fixture 1900, with the non-conductive cylinder 1912 removed for clarity. The number of charging electrodes, here exemplified by charging electrode 2000, is equal to the number of regions on the electret cylinder 400 that will become polarized during contact charging. A first electrically conductive ring 2002 at one end of the charging fixture is an electrically common point for one group of charging electrodes. A second electrically conductive ring 2004 at the opposite end of the charging fixture is an electrically common point for a second group of charging electrodes, to be charged with opposite polarity to those charged with electrodes common to the first conductive ring 2002. To charge the electret cylinder, one pole from an electrical power supply (not shown) is connected to the first ring 2002, and the opposite pole is connected to the second ring 2004. Electric fields are thus created within the electret cylinder between positive and negative charging electrodes 2000, causing electret material within the electric fields to be polarized.

It is advantageous to apply pressure from electrodes to electrets during contact charging. The contact charging fixture 1900 may apply pressure to the electret cylinder, for example by selectively constricting the fixture around the electret cylinder or by expanding the fixture before insertion of the electret cylinder and then, after insertion of the electret cylinder, elastically contracting around the electret cylinder. The charging fixture's diameter may be made compliant by removing portions of material 2006 from one or both end rings 2002 and 2004. In FIG. 20, the end rings 2002 and 2004 are shown to be completely severed to define gaps 2006 and 2008 in the end rings. Compliance may be also be increased without severing the rings, such as by selectively removing material, as is commonly done to create flexural springs using well-known methods. To constrict the charging fixture about an electret cylinder, the end ring diameters may, for example, be reduced by wrapping a tensionable strap around either end ring or both end rings or around the structure shown in FIG. 20 or around the non-conductive cylinder 1912, or by bridging a gaps 2006 and 2008 with respective screws (not shown), such that rotation of the screws draws opposing faces of the gaps together.

FIG. 21 is a side view of the contact charging fixture 1900 with an electret cylinder 400 (not visible) inserted therein. FIG. 22 is a cross-sectional view through both the contact charging fixture 1900 and the electret cylinder 400. FIG. 23 is an enlarged view of a portion 2200 of FIG. 22. A charging electrode 2000 is shown in a charging configuration, with an inner, curved surface interface 2300 of the charging electrode 2000 in intimate contact with a region that will become an electret 402 (once polarized) on the electret cylinder 400. The curved surface 2300 may be coated with a conductive liquid, such as mercury, or another conductive material, such as gallium or a eutectic alloy, preferably with a lower melting point than the charging electrode to promote transfer of charges to the electret by liquid charging. Liquid-contact charging is a method known to those with ordinary skill in the art for charging of flat electrodes.

Although the contact charging FIG. 1900 has been described for use in creating electrets on the outside surface of a cylindrical surface, the contact charging FIG. 1900 can, with suitable modifications, be used to create electrets on the inside surface of a cylindrical surface. In this case, the non-conductive surface 1912 may be placed on the inside of the electrodes 1906-1910, rather than on the outside, and electrodes 1906-1910 may be placed inside the cylinder to be processed. After the fixture 1900 is inserted into the cylinder, the fixture 1900 may be expanded to apply pressure on the inside of the cylinder. Alternatively, the fixture 1900 may be constricted before being inserted into the cylinder, and then allowed to expand once inside the cylinder to apply the pressure to the inside of the cylinder.

The contact charging fixture 1900 described with reference to FIGS. 19-23 is configured to form all the electrets 402 on the cylindrical surface at once. However, in an alternative embodiment, some of the electrodes 1906-1910 are omitted, so as to form a subset of the electrets 402 in a single step. The pressure from the contact charging fixture 1900 may be released, the fixture 1900 may be rotated, relative to the cylinder, and then another set of electrets may be formed.

Figure 29:
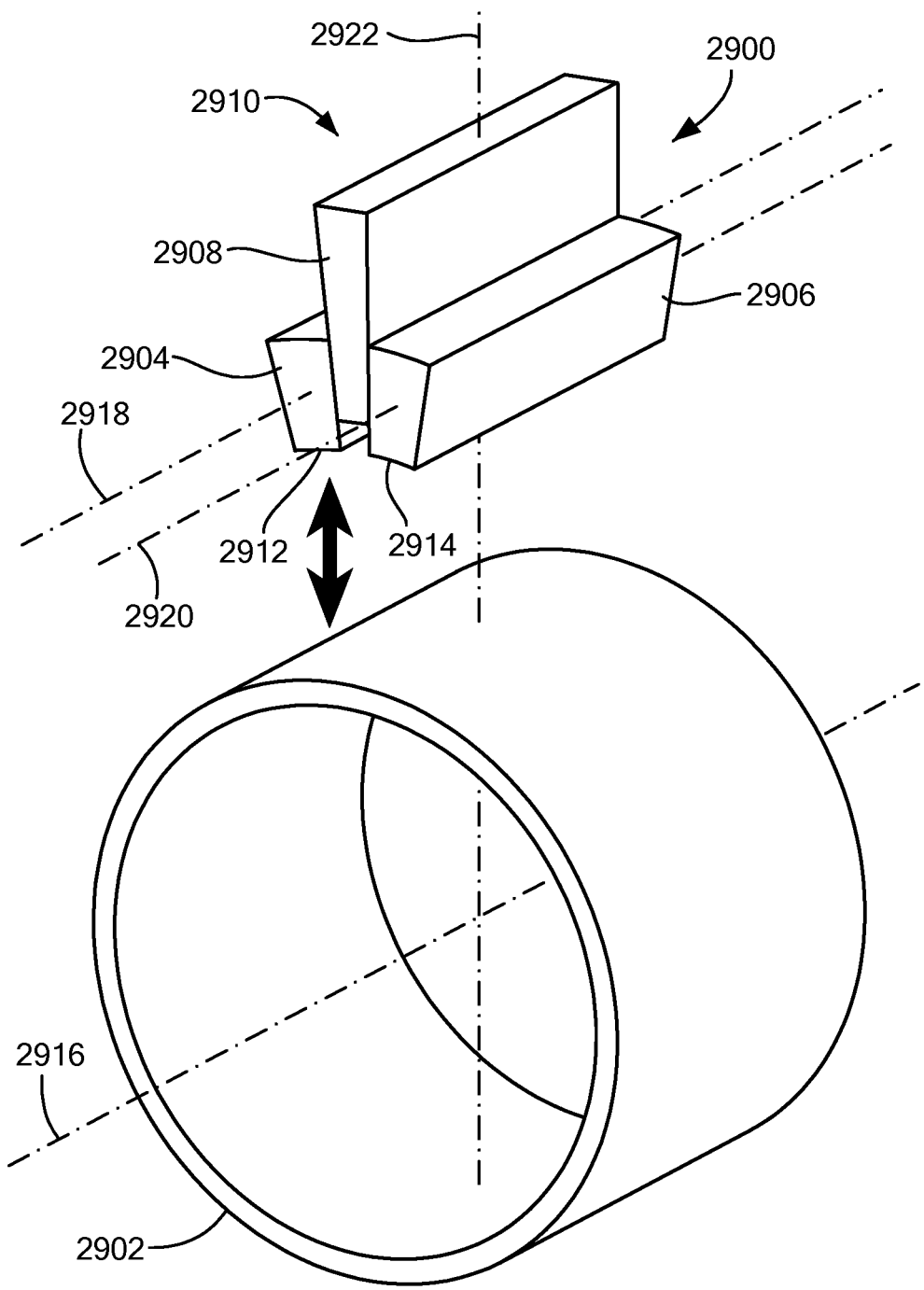
FIG. 29 is an isometric diagram illustrating a contact charging fixture, spaced apart from a dielectric cylinder, according to another embodiment of the present invention.
Figure 30:
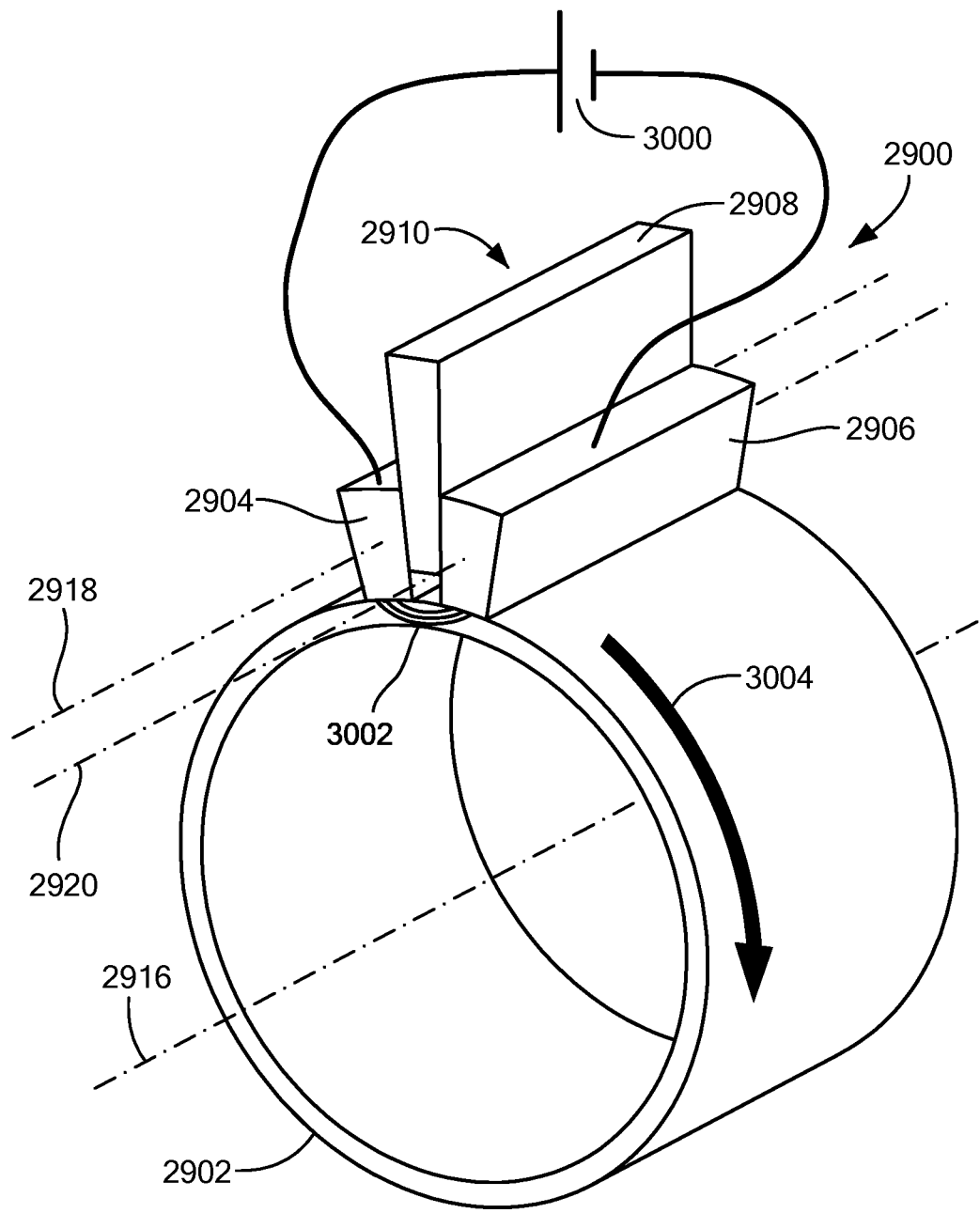
FIG. 30 is an isometric diagram illustrating the contact charging fixture of FIG. 29 in contact with the dielectric cylinder, according to the embodiment of the present invention.

In some circumstances, such as when the electrets 402 are particularly small, it may be advantageous to form the electrets 402 in pairs or other small groups, relative to the total number of electrets 402, rather than all at once. Another contact charging fixture, an embodiment of which is shown in FIGS. 29 and 30, enables forming groups of electrets on a cylindrical surface, without forming all of the ultimate electrets at once. This embodiment facilitates repeating the process of forming groups of electrets on successive locations on the cylindrical surface, including rotating the cylinder between forming each group of the electrets.

FIG. 29 is an isometric diagram illustrating a contact charging fixture 2900 disposed above a dielectric cylinder 2902 in preparation for forming a pair of electrets, and FIG. 30 is an isometric diagram illustrating the contact charging fixture 2900 in intimate physical contact with the dielectric cylinder 2902 workpiece. The contact charging fixture 2900 includes two electrodes 2904 and 2906, respectively, and an electrically insulative member 2908 separating the two electrodes 2904 and 2906. The two electrodes 2904 and 2906 and the electrically insulative member 2908 between the two electrodes 2904 and 2906 collectively form an electrode assembly 2910. End surfaces 2912 and 2914 of the electrodes 2904 and 2906 that contact the dielectric cylinder 2902 should form cylindrical sectors. The dielectric cylindrical workpiece 2902 has a longitudinal axis 2916. Each electrode 2904 and 2906 has a respective longitudinal axis 2918 and 2920. The longitudinal axes 2918, 2920 of the two electrodes 2904 and 2906 and the longitudinal axis 2916 of the workpiece 2902 are all parallel to each other.

The electrode assembly 2910 is translatable between two positions, represented by FIGS. 29 and 30, respectively. The electrode assembly 2910 is translatable along an axis 2922 that is perpendicular to the longitudinal axis 2916 of the workpiece 2902. In use, the two electrodes 2904 and 2906 are electrically coupled to an electrical power supply 3000 (FIG. 30), and the electrode assembly 2910, specifically the electrodes 2904 and 2906, is brought into intimate physical contact with the surface of the dielectric cylinder 2902, as shown in FIG. 30, creating an electric field 3002 within the dielectric cylinder 2902 and thereby forming two electrets on a surface of the workpiece 2902. Pressure should be applied by the contact charging fixture 2900, specifically the electrodes 2904 and 2906, on the surface of the dielectric cylinder 2902.

Once the electrets are formed, the electrical power supply 3000 may be disconnected and the electrode assembly 2910 is withdrawn from the surface of the dielectric cylinder 2902, as shown in FIG. 29. Then, the dielectric cylinder 2902, or the contact charging fixture 2900, is rotated, for example as indicated by an arrow 3004, a distance to index the contact charging fixture 2900, relative to the dielectric cylinder 2902, to a position of the next set of electrets. The forming process is repeated for each subsequent set of electrets.

Although the electrode assembly 2910 is shown with two electrodes 2904 and 2906, the electrode assembly 2910 may include any number of electrodes. Thus, although described as forming two electrets at a time, the contact charging fixture 2900 may form any number of electrets at a time. As with the contact charging fixture 1900 (FIG. 19), with suitable modifications, the contact charging fixture 2900 may be configured to form electrets on an inside surface of a cylinder.

Figure 24:
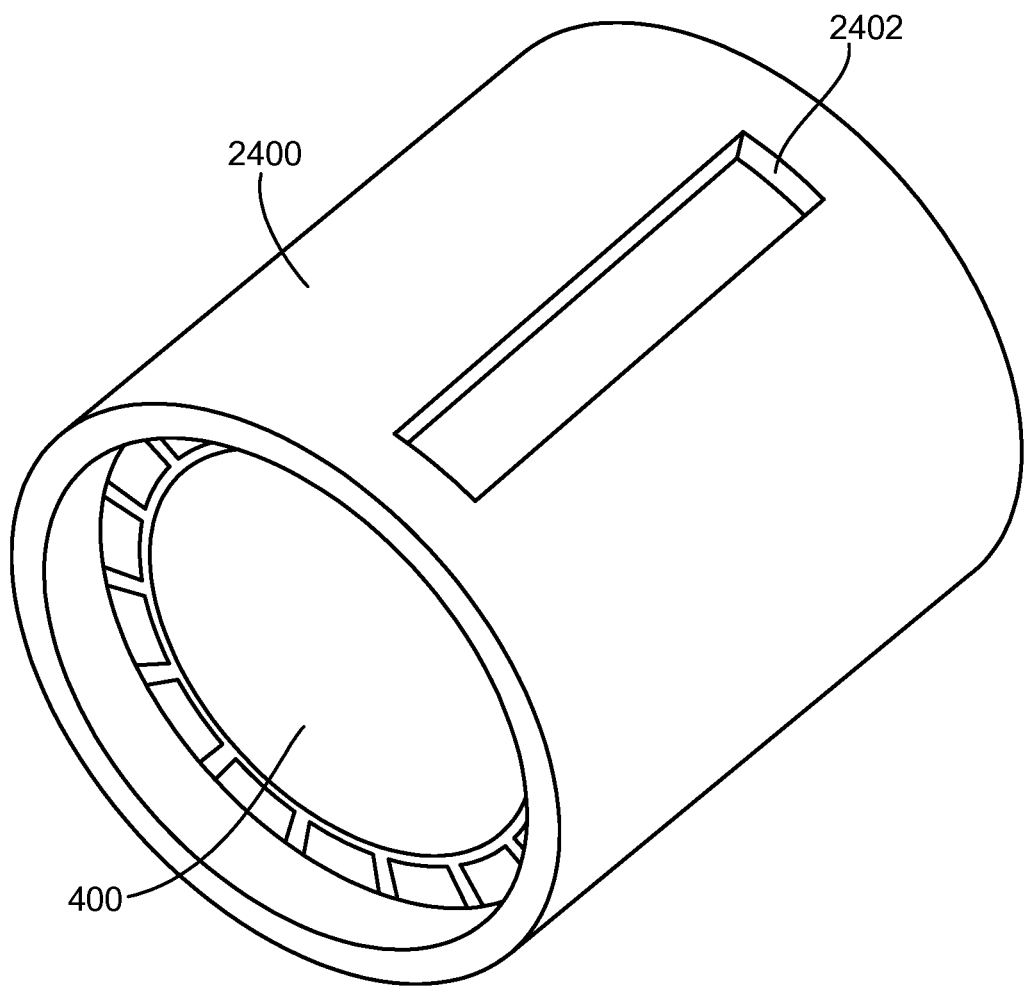
FIG. 24 is an isometric diagram of a mask with an aperture, through which ions may be guided to corona-charge a defined region in an electret cylinder or other curved surface, according to an embodiment of the present invention.
Figure 25:
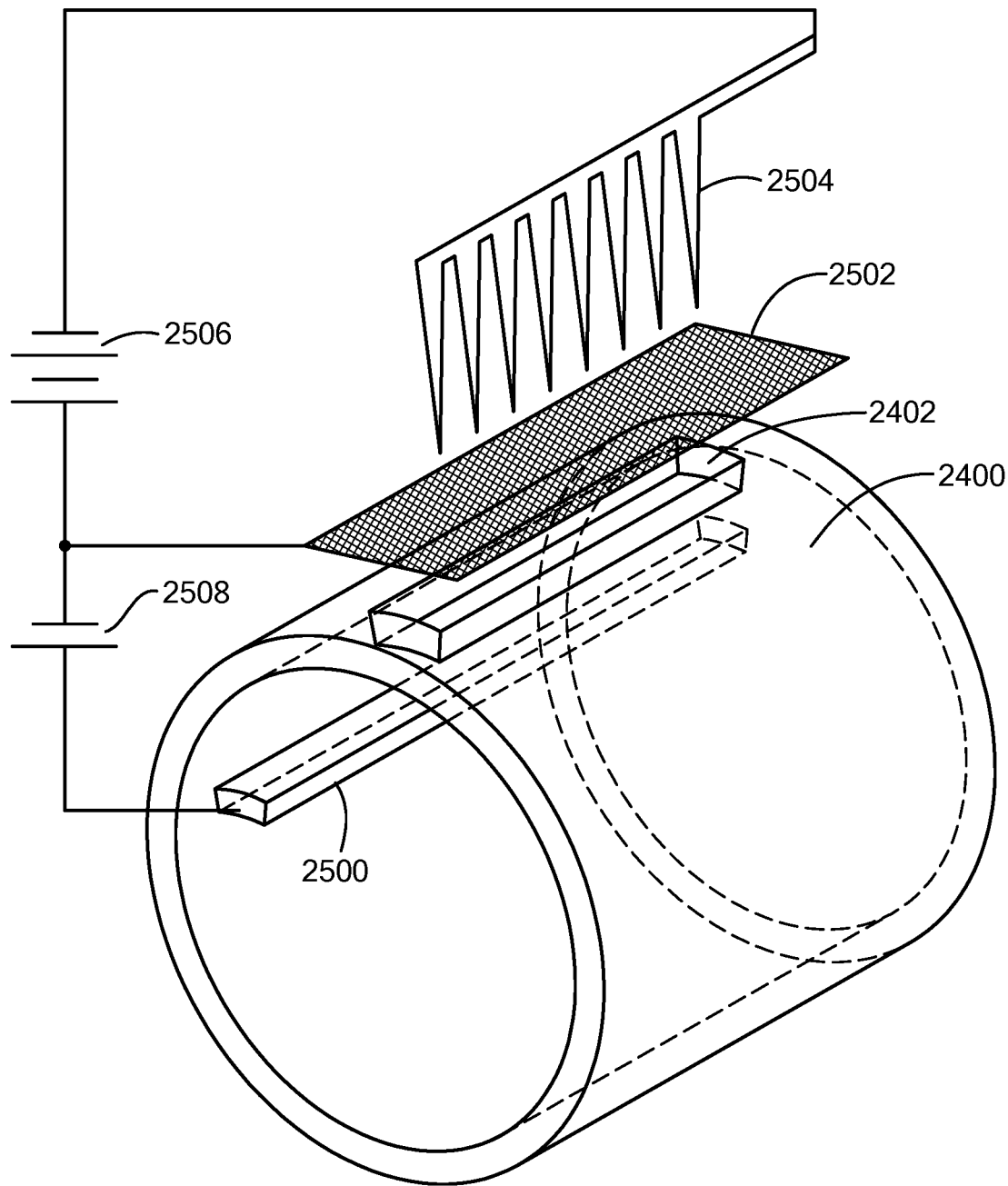
FIG. 25 is an isometric schematic diagram of an apparatus, including the mask of FIG. 24, of a corona charging system, according to an embodiment of the present invention.

Another embodiment of the present invention is a method for corona-charging defined regions in an electret cylinder. Corona charging of flat electrets is known. However, as noted, charging curved electrets poses problems for conventional charging methods. FIG. 24 is an isometric diagram of a mask 2400 with an aperture 2402, through which ions may be guided to corona-charge a region defined by the aperture 2402 in an electret cylinder or other curved surface. FIG. 25 is an isometric/schematic diagram of the mask 2400, without the electret cylinder, but with other components of a corona charging system, according to an embodiment of the present invention. These components include an electrode 2500, a conductive mesh 2502, and an array of one or more sharp, electrically conductive needles 2504 (a "needle array").

The wall of an electret cylinder (not shown for clarity) is positioned between the electrode 2500 and the aperture 2402. A first voltage source 2506 is connected to the needle array 2504, causing air to ionize near the needle points. The potential between the electrode 2500, which has opposite polarity to the needles 2504, accelerates ions through the aperture 2402 and onto the electret cylinder. The mask 2400 prevents ions from reaching areas of the electret cylinder, other than a region exposed through the aperture 2402. The mesh grid 2502 is connected to a second voltage source 2508 with the same polarity as the first voltage source 2506 used to charge the needles 2504, but of a lower amplitude. The mesh grid 2502 promotes uniform distribution of charge on the electret cylinder.

The charged region on the electret is given a positive or negative charge, depending on the polarity of voltage sources 2506 and 2508, respectively. Reversing the polarity of both voltage sources 2506 and 2508, or exchanging the relative positions of (a) the needle array 2504 and mesh grid 2502 and (b) the electrode 2500, causes an electret region to be charged to the opposite polarity. Alternating regions of positive and negative charge may be created on the electret cylinder by: (1) charging a region of the electret cylinder with a first charge, then (2) rotating the electret cylinder, relative to the mask, so the aperture 2402 reveals an uncharged region of the electret cylinder, then (3) corona charging the uncharged region with a charge opposite the first charge and repeating the process for the remaining desired regions. The needle array 2504, the mesh grid 2502, the mask 2400 and the electrode 2500 are maintained in a fixture orientation, relative to one another.

In an alternative embodiment for corona charging, multiple regions on the electret cylinder may be simultaneously charged. In this embodiment, the mask 2400 contains multiple apertures 2402, and the electrode 2500 forms a complete cylinder, or at least has portions disposed under each aperture 2402. A separate needle array 2504 is positioned above each aperture 2402. All the needle arrays 2504 are made electrically common to the needle array voltage source 2506. The mesh grid 2502 forms a complete cylinder, enclosing the mask 2400, or at least has portions disposed between each needle array 2504 and its corresponding aperture 2402. Activating the voltage sources causes a pattern of polarized regions to be created on the electret cylinder. An equal number of polarized regions of the opposite polarity may be created by: (1) charging a plurality of regions of the electret cylinder, then (2) disconnecting the voltage sources, (3) rotating the electret cylinder, relative to the mask, such that the apertures 2402 align with unpolarized regions of electret material, and then (4) reconnecting the voltage sources 2506 and 2508, but with reversed polarity.

In another embodiment, two sets of voltage sources, needle arrays, mesh grids and electrodes are used, with each set configured to charge the electret cylinder with an opposite charge. In this embodiment, the mask defines an aperture for each region of the electret cylinder that is to be charged. This embodiment does not require rotating the electret cylinder. Both polarities of regions on the electret cylinder may be charged simultaneously, or each polarity may be charged in turn.

Contact charging, liquid contact charging and corona charging are described in Kao, Kwan Chi, "Dielectric Phenomena in Solids," ISBN 9780123965625, Academic press, 2504.

Imbedded Electrets

Rather than form the electrets in the cylinder of electret material 400, the electrets may be formed as separate strips or other suitable shapes and attached to the cylinder. The electrets may be attached to the surface of the cylinder, such as by a suitable adhesive. Alternatively, the electrets may be press fit or interference fit into suitable grooves in the surface of the cylinder. Optionally, the electrets may have a cross-sectional shape, such as a trapezoid, that locks into a similar cross-sectional shape defined by the groove, when the electret is pressed into the groove.

Hydrostatic or Aerostatic Bearing

Figure 32:
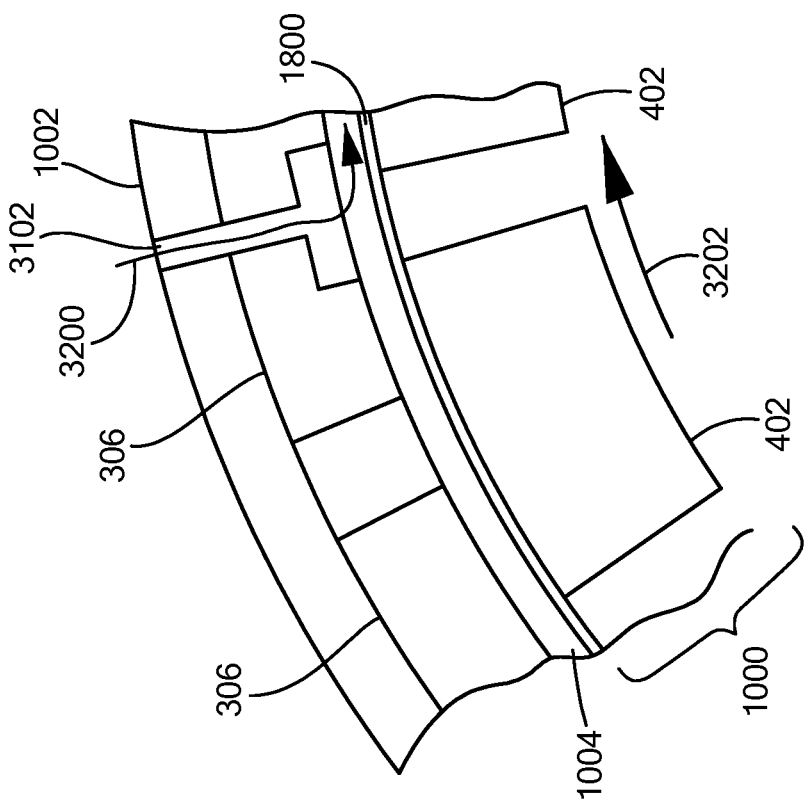
FIG. 32 is a cross-sectional view of a portion of the rotor and stator shown in FIG. 31, showing one fluid port of the hydrostatic or aerostatic bearing, according to an embodiment of the present invention.
Figure 31:
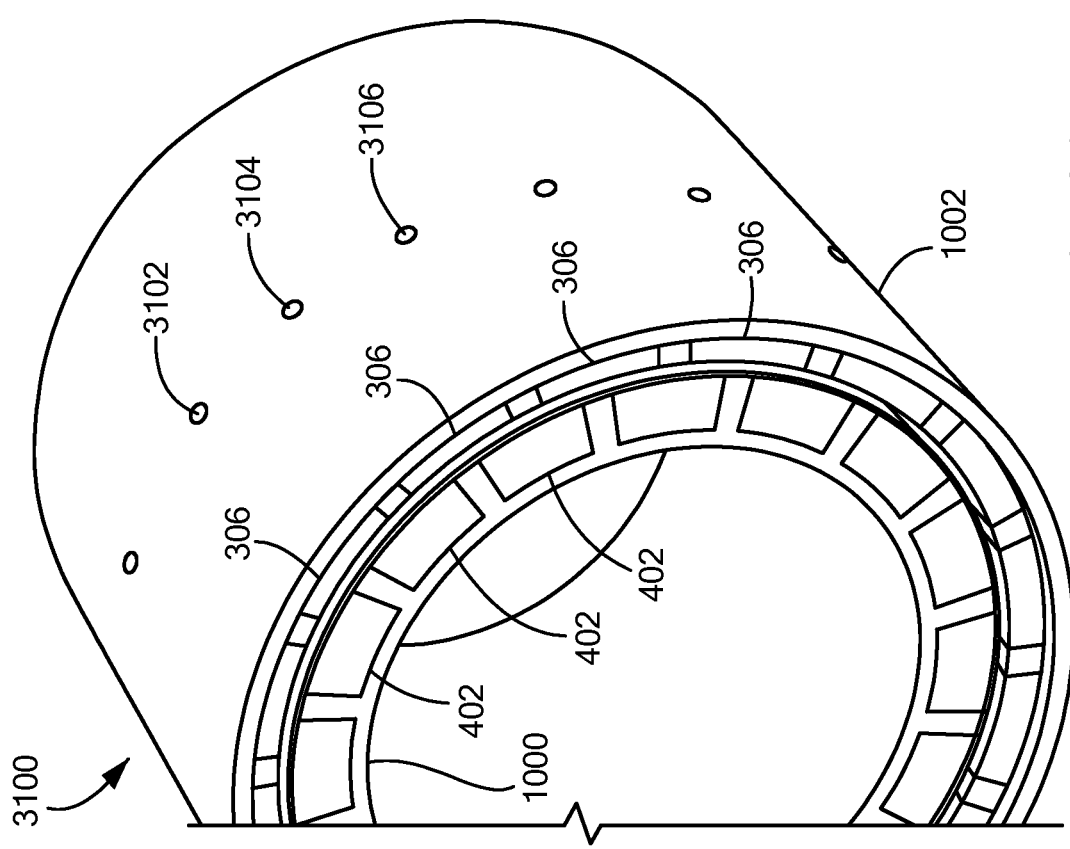
FIG. 31 is an isometric diagram of a hydrostatic or aerostatic bearing between a rotor and a stator of an electrostatic motor, according to an embodiment of the present invention.

FIG. 31 is an isometric diagram of a hydrostatic or aerostatic (depending on whether the dielectric fluid 1004 is a liquid or a gas) bearing 3100 between a rotor 1000 and a stator 1002 of an electrostatic motor. For simplicity of explanation, the term hydrostatic, as used herein, including in the claims, means hydrostatic or aerostatic. The hydrostatic bearing 3100 defines a plurality of ports, represented by ports 3102, 3104 and 3106, extending through respective electrodes 402. FIG. 32 is a cross-sectional view of a portion of the rotor 1000 and stator 1002 showing one fluid port 3102 of the hydrostatic bearing 3100 extending through one of the electrodes 306. Dielectric fluid flows, as indicated by an arrow 3200, as a result of rotation 3202 of the rotor 1000 into the cylindrical shell defined between the rotor 1000 and the stator 1002. The dielectric fluid flow supports the rotor 1000 within the stator 1002.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±25%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. An electrostatic motor, comprising:
a rotor, rotatable about a rotation axis and defining a first cylindrical surface having a longitudinal axis coincident with the rotation axis and having a first plurality of elongated charge members disposed circumferentially on the first cylindrical surface, each first charge member extending parallel to the longitudinal axis;
a stator defining a second cylindrical surface counterfacing, and spaced apart from, the first cylindrical surface and having a second plurality of elongated charge members disposed circumferentially on the second cylindrical surface, each second charge member extending parallel to the longitudinal axis; wherein:
one surface of the first and second cylindrical surfaces is an outside cylindrical surface, and the other surface of the first and second cylindrical surfaces is an inside cylindrical surface, the first and second cylindrical surfaces define a cylindrical shell therebetween, and a dielectric fills the cylindrical shell;

one plurality of charge members of the first and second pluralities of charge members comprises a plurality of electrets arranged such that adjacent electrets are of opposite charge;

the other plurality of charge members of the first and second pluralities of charge members comprises a first plurality of electrodes; the electrostatic motor further comprising:

a plurality of first charging electrodes, one first charging electrode of the plurality of first charging electrodes for each respective electret of the plurality of electrets, each first charging electrode being disposed below, and in intimate contact with, the respective electret.

2. An electrostatic motor according to claim 1, further comprising:

a first electrically conductive circuit disposed within the rotor or the stator and electrically connecting every other first charging electrode of the plurality of first charging electrodes; and a second electrically conductive circuit, electrically isolated from the first electrically conductive circuit, disposed within the rotor or the stator and electrically connecting intermediate first charging electrodes of the plurality of first charging electrodes.

3. An electrostatic motor according to claim 1, further comprising a plurality of second charging electrodes, one second charging electrode of the plurality of second charging electrodes for each respective electret of the plurality of electrets, each second charging electrode being disposed on an opposite side of the respective electret from the corresponding first charging electrode, and in intimate contact with the electret.

4. An electrostatic motor according to claim 3, further comprising:

a third electrically conductive circuit disposed within the rotor or the stator and electrically connecting every other second charging electrode of the plurality of second charging electrodes; and a fourth electrically conductive circuit, electrically isolated from the third electrically conductive circuit, disposed within the rotor or the stator and electrically connecting intermediate second charging electrodes of the plurality of second charging electrodes.

5. A method of manufacturing a rotor of an electrostatic motor, the method comprising:

depositing a layer of electrically conductive material on a surface of a cylinder of electret material;

patterning the electrically conductive material to form a plurality of discrete electrodes; and depositing a layer of electret material on top of the plurality of discrete electrodes to bury a portion, not all, of the electrically conductive material.

* * * * *